(12) United States Patent
Shi et al.

(10) Patent No.: US 11,397,247 B2
(45) Date of Patent: Jul. 26, 2022

(54) LASER MEASUREMENT MODULE AND LASER RADAR

(71) Applicant: HUAWEI TECHNOLOGIES CO., LTD., Guangdong (CN)

(72) Inventors: Guangyuan Shi, Wuhan (CN); Li Zeng, Shenzhen (CN); Xinhua Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/241,697

(22) Filed: Apr. 27, 2021

(65) Prior Publication Data

US 2021/0247498 A1 Aug. 12, 2021

Related U.S. Application Data

(63) Continuation of application No. PCT/CN2019/129585, filed on Dec. 28, 2019.

(30) Foreign Application Priority Data

Dec. 29, 2018 (CN) .......................... 201811639922.1
Jun. 29, 2019 (CN) .......................... 201910581553.3

(51) Int. Cl.
  *G01S 7/48* (2006.01)
  *G01S 7/481* (2006.01)
  (Continued)

(52) U.S. Cl.
  CPC .......... *G01S 7/4817* (2013.01); *G01S 7/4815* (2013.01); *G01S 7/4816* (2013.01); *G01S 17/08* (2013.01);
  (Continued)

(58) Field of Classification Search
  None
  See application file for complete search history.

(56) References Cited

U.S. PATENT DOCUMENTS 9,869,754 B1 1/2018 Campbell et al.
10,036,801 B2 7/2018 Retterath et al.
(Continued)

FOREIGN PATENT DOCUMENTS

CN 1379263 A 11/2002
CN 1847881 A 10/2006
(Continued)

OTHER PUBLICATIONS

Office Action issued in Chinese Application No. 201910581553.3 dated Jun. 23, 2021, 34 pages (with English translation).
(Continued)

*Primary Examiner* — Hovhannes Baghdasaryan
(74) *Attorney, Agent, or Firm* — Fish & Richardson P.C.

(57) ABSTRACT

Embodiments of this application disclose a laser measurement system and a laser radar. In one aspect, a laser measurement system includes N laser ranging components, a reflector, and MEMS micromirror. The N laser ranging components can emit an emergent light beam onto the reflector. The reflector can perform optical path reflecting on the emergent light beam and emit the reflected emergent light beam onto the MEMS micromirror. The MEMS micromirror can change a direction of the emergent light beam to implement two-dimensional scanning, change a direction of an echo light beam, and emit this beam onto the reflector. The reflector can perform optical path reflecting on the echo light beam and emit this beam onto the N laser ranging components. The N laser ranging components can receive
(Continued)

the echo light beam and perform ranging based on a time difference between the emergent light beam and the echo light beam.

19 Claims, 19 Drawing Sheets

(51) Int. Cl.
    *G01S 17/08*     (2006.01)
    *G02B 26/08*     (2006.01)
    *G02B 26/10*     (2006.01)

(52) U.S. Cl.
    CPC ....... *G02B 26/0833* (2013.01); *G02B 26/101* (2013.01)

(56) References Cited

U.S. PATENT DOCUMENTS

| | | | |
|---|---|---|---|
| 10,775,508 B1* | 9/2020 | Rezk | G01S 7/4816 |
| 2011/0188038 A1* | 8/2011 | Gollier | G02B 26/101 |
| | | | 356/328 |
| 2015/0369917 A1* | 12/2015 | Bridges | G01S 17/86 |
| | | | 356/4.01 |
| 2018/0143302 A1 | 5/2018 | Osiroff et al. | |
| 2018/0275249 A1* | 9/2018 | Campbell | G01S 17/10 |
| 2018/0328563 A1* | 11/2018 | Park | B60Q 1/085 |
| 2019/0101645 A1* | 4/2019 | DeMersseman | G01S 17/87 |
| 2019/0310464 A1* | 10/2019 | Janes | G01J 3/4406 |
| 2020/0173921 A1* | 6/2020 | Fujiwara | G02B 19/0014 |

FOREIGN PATENT DOCUMENTS

| | | |
|---|---|---|
| CN | 101165535 A | 4/2008 |
| CN | 202102175 U | 1/2012 |
| CN | 102365573 A | 2/2012 |
| CN | 102520412 A | 6/2012 |
| CN | 102944879 A | 2/2013 |
| CN | 103969658 A | 8/2014 |
| CN | 104914445 A | 9/2015 |
| CN | 205120965 U | 3/2016 |
| CN | 106353745 A | 1/2017 |
| CN | 106443634 A | 2/2017 |
| CN | 106646494 A | 5/2017 |
| CN | 106772407 A | 5/2017 |
| CN | 107209267 A | 9/2017 |
| CN | 107219532 A | 9/2017 |
| CN | 107272014 A | 10/2017 |
| CN | 107607056 A | 1/2018 |
| CN | 108061884 A | 5/2018 |
| CN | 108089174 A | 5/2018 |
| CN | 108132472 A | 6/2018 |
| CN | 108226936 A | 6/2018 |
| CN | 108387908 A | 8/2018 |
| CN | 108594251 A | 9/2018 |
| CN | 108603758 A | 9/2018 |
| CN | 108761482 A | 11/2018 |
| CN | 109031243 A | 12/2018 |
| CN | 109031244 A | 12/2018 |
| CN | 109031345 A | 12/2018 |
| CN | 208188335 U | 12/2018 |
| WO | 2018055449 A2 | 3/2018 |

OTHER PUBLICATIONS

Office Action issued in Chinese Application No. 201910581553.3 dated Aug. 13, 2021, 17 pages.

Office Action issued in Chinese Application No. 202137030496 dated May 20, 2022, 5 pages.

* cited by examiner

LASER MEASUREMENT MODULE AND LASER RADAR

CROSS-REFERENCE TO RELATED APPLICATIONS

This application is a continuation of International Application No. PCT/CN2019/1129585, filed on Dec. 28, 2019, which claims priority to Chinese Patent Application No. 201811639922.1, filed on Dec. 29, 2018 and Chinese Patent Application No. 201910581553.3, filed on Jun. 29, 2019. The disclosures of the aforementioned applications are hereby incorporated by reference in their entireties.

TECHNICAL FIELD

This application relates to the field of optical communications technologies, and in particular, to a laser measurement module and a laser radar.

BACKGROUND

A laser radar is an active remote sensing instrument using a laser as a measurement light source, and has advantages of long measurement distance, high precision, high resolution, full-time measurement, and the like, so that the laser radar plays an important role in fields such as geographic information surveying and mapping, unmanned vehicle autonomous driving, and digital city. In recent years, an autonomous driving technology has developed rapidly, and the laser radar is gradually changing from mechanization to solidification. A solid-state laser radar using a micro-electro-mechanical system (MMS) micromirror as a light beam pointing controller has advantages of high measurement precision, fast scanning speed, flexible and configurable number of scanning lines, low mechanical wear, low costs, mass production, and the like, and represents a future development direction. In addition, an MEMS laser radar features high integration, small size, and low power consumption, and can be integrated into a vehicle body to greatly improve an appearance of an unmanned vehicle.

Although the solid-state laser radar has great potential, the solid-state laser radar is far from a mechanical laser radar in key technical specifications such as a scanning angle and resolution. To meet a technical requirement of unmanned driving, a scanning angle and resolution of a system need to be further improved. Therefore, a most direct and effective technical method is to integrate a plurality of groups of laser scanning components in the laser radar. In other words, a quantity of laser scanning components may be increased to improve the scanning angle and the resolution of the system.

In the prior art, a typical coaxial MEMS laser radar is provided, including the plurality of groups of laser scanning components, and each group of laser scanning components include a laser light source, a detector, and an MEMS micromirror. A measurement light beam of each group of laser scanning components is emitted through an optical window; and a structure layout is performed on each group of laser scanning components, to implement splicing of scanning point clouds. Because an independent MEMS micromirror is disposed in each group of laser scanning components, integration of the entire laser radar is relatively low, and manufacturing costs of the laser radar are increased.

SUMMARY

Embodiments of this application provide a laser measurement module and a laser radar, to improve integration and compactness of the laser measurement module, and effectively reduce manufacturing costs of the laser radar.

To resolve the foregoing technique problems, the embodiments of this application provide the following technical solutions.

According to a first aspect, an embodiment of this application provides a laser measurement module, including N laser ranging components, a reflector, and one micro-electro-mechanical system MEMS micromirror, where N is a positive integer greater than or equal to 2. The N laser ranging components each are configured to emit an emergent light beam onto the reflector. The reflector is configured to perform optical path reflecting on the emergent light beam, and emit the reflected emergent light beam onto the MEMS micromirror. The MEMS micromirror is configured to change a direction of the emergent light beam to implement two-dimensional scanning; and further configured to change a direction of an echo light beam, and emit the echo light beam onto the reflector, where the echo light beam is a light beam reflected by the emergent light beam emitted onto a target object. The reflector is further configured to perform optical path reflecting on the echo light beam, and emit the reflected echo light beam onto each of the N laser ranging components. The N laser ranging components each are further configured to receive the echo light beam, and perform ranging based on a time difference between the emergent light beam and the echo light beam.

In this embodiment of this application, the laser measurement module includes the N laser ranging components, the reflector, and the one MEMS micromirror. The emergent light beam of each of the N laser ranging components may be emitted onto the MEMS micromirror by the reflector, and the MEMS micromirror changes the direction of the emergent light beam to implement the two-dimensional scanning. After the emergent light beam is emitted from the MEMS micromirror, the emergent light beam is emitted onto the target object, to generate the echo light beam. The MEMS micromirror may further change the direction of the echo light beam, and emit the echo light beam onto each of the N laser ranging components by the reflector. Therefore, each of the N laser ranging components may receive the echo light beam, and perform ranging based on the time difference between the emergent light beam and the echo light beam. In this embodiment of this application, the reflector of the laser measurement module may reflect the emergent light beam and the echo light beam of each of the N laser ranging components, so that the N laser ranging components may share one MEMS micromirror. Therefore, only one MEMS micromirror needs to be disposed in the laser measurement module, and a corresponding MEMS micromirror does not need to be disposed for each laser ranging component. The reflector is configured to implement an optical path connection between a plurality of laser ranging components and a single MEMS micromirror. This improves integration and compactness of the laser measurement module, and effectively reduces manufacturing costs of a laser radar. The laser measurement module can be used in fields such as autonomous driving and intelligent driving.

In a possible implementation of the first aspect, the laser measurement module further includes N light beam diverting elements. The N light beam diverting elements one-to-one correspond to N reflectors. Each of the N laser ranging components is configured to emit the emergent light beam onto a corresponding reflector through a corresponding light beam diverting element. A quantity of laser ranging components in the laser measurement module and a quantity of reflectors in the laser measurement module are equal, and are both N. One laser ranging component corresponds to one reflector. To be specific, the emergent light beam of each laser ranging component is sent only to a reflector corresponding to the laser ranging component. Similarly, an echo light beam received by a reflector from the MEMS micromirror is also sent only to a laser ranging component corresponding to the reflector. In this embodiment of this application, the N laser ranging components share a same MEMS micromirror, and each laser ranging component corresponds to one independent reflector. In this way, a location of the laser ranging component in the laser measurement module may always be fixed, and a scanning angle, a light emission direction, an appearance, and the like of the laser radar may be changed only by adjusting a design of the reflector. A flexible optical path architecture greatly improves application scalability of the laser radar. In addition, in this embodiment of this application, each laser ranging component may send the emergent light beam of the laser ranging component to the corresponding reflector. Therefore, the location of the laser ranging component is fixed, and only a passive reflector is adjusted to perform optical path calibration, so as to improve stability and convenience of optical path commissioning.

In a possible implementation of the first aspect, the laser measurement module further includes N light beam diverting elements. The N light beam diverting elements one-to-one correspond to N reflectors. Each of the N laser ranging components is configured to emit the emergent light beam onto a corresponding reflector through a corresponding light beam diverting element. Specifically, the laser measurement module further includes the N light beam diverting elements, A quantity of laser ranging components in the laser measurement module and a quantity of reflectors in the laser measurement module are both N. Therefore, a quantity of light beam diverting elements in the laser measurement module is equal to the quantity of laser ranging components in the laser measurement module, and the quantity of light beam diverting elements in the laser measurement module is also equal to the quantity of reflectors in the laser measurement module. Each of the N laser ranging components sends the emergent light beam of each laser ranging component to the corresponding reflector through one light beam diverting element.

In a possible implementation of the first aspect, the light beam diverting element is a diverting mirror.

In a possible implementation of the first aspect, the laser measurement module further includes a light beam diverting element. The light beam diverting element is configured to refract the emergent light beam of the laser ranging component, and emit the refracted emergent light beam onto the reflector. The light beam diverting element is further configured to emit the echo light beam sent by the reflector onto the laser ranging component. The light beam diverting element is configured to divert a light beam received by the element. For example, the light beam diverting element has a light beam refraction function, so that a direction of the light beam received by the element can be changed. The light beam diverting element receives the emergent light beam from the laser ranging component, and may refract the emergent light beam. The light beam diverting element receives the echo light beam from the reflector, then refracts the echo light beam, and finally sends the echo light beam to the laser ranging component. The laser ranging component performs ranging.

In a possible implementation of the first aspect, the light beam diverting element is a refracting mirror.

In a possible implementation of the first aspect, when a value of N is an odd number greater than or equal to 5, the laser measurement module further includes (N−1) light beam diverting elements. If i is less than (N+1)/2, an $i^{th}$ laser ranging component in the N laser ranging components is connected to an $i^{th}$ reflector in the N reflectors through an $i^{th}$ light beam diverting element in the (N−1) light beam diverting elements. Alternatively, if i is greater than (N+1)/2, an $i^{th}$ laser ranging component in the N laser ranging components is connected to an $i^{th}$ reflector in the N reflectors through an $(i-1)^{th}$ light beam diverting element in the (N−1) light beam diverting elements, where i is a positive integer less than or equal to N. Specifically, when the value of N is the odd number greater than or equal to 5, the laser measurement module further includes the (N−1) light beam diverting elements. Because the quantity of laser ranging components in the laser measurement module and the quantity of reflectors in the laser measurement module are both N, the quantity of light beam diverting elements in the laser measurement module is one less than the quantity of laser ranging components in the laser measurement module. An $((N+1)/2)^{th}$ laser ranging component located in a center of the N laser ranging components directly sends an emergent light beam of the $((N+1)/2)^{th}$ laser ranging component to an $((N+1)/2)^{th}$ reflector without using a light beam diverting element. Laser ranging components other than the $((N+1)/2)^{th}$ laser ranging component in the N laser ranging components respectively send emergent light beams to corresponding reflectors through light beam diverting elements.

In a possible implementation of the first aspect, when a value of N is an even number greater than or equal to 6, the laser measurement module further includes (N−2) light beam diverting elements. If i is less than N/2, an $i^{th}$ laser ranging component in the N laser ranging components is connected to an $i^{th}$ reflector in the N reflectors through an $i^{th}$ light beam diverting element in the (N−2) light beam diverting elements. Alternatively, if i is greater than (N+2)/2, an $i^{th}$ laser ranging component in the N laser ranging components is connected to an $i^{th}$ reflector in the N reflectors through an $(i-2)^{th}$ light beam diverting element in the (N−2) light beam diverting elements, where i is a positive integer less than or equal to N. Specifically, when the value of N is the even number greater than or equal to 6, the laser measurement module further includes the (N−2) light beam diverting elements. Because the quantity of laser ranging components and the quantity of reflectors in the laser measurement module are both N, the quantity of light beam diverting elements in the laser measurement module is two less than the quantity of laser ranging components. An $((N+2)/2)^{th}$ laser ranging component and an $(N/2)^{th}$ laser ranging component that are located in a center of the N laser ranging components respectively directly send, without using light beam diverting elements, an emergent light beam of the $((N+2)/2)^{th}$ laser ranging component to an $((N+2)/2)^{th}$ reflector and an emergent light beam of the $(N/2)^{th}$ laser ranging component to an $(N/2)^{th}$ reflector. Laser ranging components other than the $((N+2)/2)^{th}$ laser ranging component and the $(N/2)^{th}$ laser ranging component in the N laser ranging components respectively send emergent light beams to corresponding reflectors through light beam diverting elements.

In a possible implementation of the first aspect, the N reflectors are located on a same straight line, and when N is the odd number greater than or equal to 5, the $((N+1)/2)^{th}$ reflector is used as the center. If i is an integer greater than 2 and less than or equal to (N+1)/2, a spacing between an $(i-2)^{th}$ reflector and an $(i-1)^{th}$ reflector in the N reflectors is not less than a spacing between the $(i-1)^{th}$ reflector and an $i^{th}$ reflector in the N reflectors. Alternatively, if i is an integer greater than (N+1)/2 and less than or equal to N, a spacing between an $(i-2)^{th}$ reflector and an $(i-1)^{th}$ reflector in the N reflectors is not greater than a spacing between the $(i-1)^{th}$ reflector and an $i^{th}$ reflector in the N reflectors. The N reflectors are located on the same straight line. For example, mirror surface centers of the N reflectors may be located on a same straight line, the N reflectors are symmetrically distributed, and intervals between every two adjacent reflectors in the N reflectors are not equal. When the value of N is the odd number greater than or equal to 5, the $((N+1)/2)^{th}$ reflector is used as the center. For example, if the value of N is 5, a third reflector is used as the center. Reflectors other than the $((N+1)/2)^{th}$ reflector in the N reflectors are symmetrically distributed at unequal intervals. The intervals between every two adjacent reflectors in the N reflectors may be equal or not equal. For example, when N is equal to 3, the intervals between every two adjacent reflectors in the N reflectors are equal. For another example, the intervals between every two adjacent reflectors in the N reflectors are not equal. A spacing between two reflectors closer to the center is smaller, and a spacing between two reflectors farther away from the center is larger. For example, if i is greater than 2 and less than or equal to (N+1)2, the spacing between the $(i-2)^{th}$ reflector and the $(i-1)^{th}$ reflector in the N reflectors is not less than the spacing between the $(i-1)^{th}$ reflector and the $i^{th}$ reflector in the N reflectors. The $(i-2)^{th}$ reflector, the $(i-1)^{th}$ reflector, and the $i^{th}$ reflector are successively close to the center (namely, the $((N+1)/2)^{th}$ reflector). Therefore, the spacing between the $(i-1)^{th}$ reflector and the $i^{th}$ reflector is not greater than the spacing between the $(i-2)^{th}$ reflector and the $(i-1)^{th}$ reflector in the N reflectors. Similarly, if i is greater than (N+1)/2 and less than or equal to N, the spacing between the $(i-2)^{th}$ reflector and the $(i-1)^{th}$ reflector in the N reflectors is not greater than the spacing between the $(i-1)^{th}$ reflector and the $i^{th}$ reflector in the N reflectors.

In a possible implementation of the first aspect, the N reflectors are located on a same straight line, and when the value of N is the even number greater than or equal to 6, a midpoint between the $(N/2)^{th}$ reflector and an $(N/2+1)^{th}$ reflector is used as the center. If i is an integer greater than 2 and less than or equal to N/2, a spacing between an $(i-2)^{th}$ reflector and an $(i-1)^{th}$ reflector in the N reflectors is not less than a spacing between the $(i-1)^{th}$ reflector and an $i^{th}$ reflector in the N reflectors. Alternatively, if i is an integer greater than N/2 and less than or equal to N, a spacing between an $(i-2)^{th}$ reflector and an $(i-1)^{th}$ reflector in the N reflectors is not greater than a spacing between the $(i-1)^{th}$ reflector and an $i^{th}$ reflector in the N reflectors. The N reflectors are located on the same straight line. For example, mirror surface centers of the N reflectors may be located on a same straight line, the N reflectors are symmetrically distributed, and intervals between every two adjacent reflectors in the N reflectors are not equal. When the value of N is the even number greater than or equal to 6, the midpoint between the $(N/2)^{th}$ reflector and the $(N/2+1)^{th}$ reflector is used as the center, and reflectors other than the $(N/2)^{th}$ reflector and the $(N/2+1)^{th}$ reflector in the N reflectors are symmetrically distributed at unequal intervals. The intervals between every two adjacent reflectors in the N reflectors may be equal or not equal. For example, when N is equal to 3, the intervals between every two adjacent reflectors in the N reflectors are equal. For another example, the intervals between every two adjacent reflectors in the N reflectors are not equal. A spacing between two reflectors closer to the center is smaller, and a spacing between two reflectors farther away from the center is larger. For example, if i is greater than 2 and less than or equal to N/2, the spacing between the $(i-2)^{th}$ reflector and the $(i-1)^{th}$ reflector in the N reflectors is not less than the spacing between the $(i-1)^{th}$ reflector and the $i^{th}$ reflector in the N reflectors. The $(i-2)^{th}$ reflector, the $(i-1)^{th}$ reflector, and the $i^{th}$ reflector are successively close to the center (namely, the midpoint between the $(N/2)^{th}$ reflector and the $(N/2+1)^{th}$ reflector). Therefore, the spacing between the $(i-1)^{th}$ reflector and the $i^{th}$ reflector is not greater than the spacing between the $(i-2)^{th}$ reflector and the $(i-1)^{th}$ reflector in the N reflectors. Similarly, if i is greater than N/2 and less than or equal to N, the spacing between the $(i-2)^{th}$ reflector and the $(i-1)^{th}$ reflector in the N reflectors is not greater than the spacing between the $(i-1)^{th}$ reflector and the $i^{th}$ reflector in the N reflectors.

In a possible implementation of the first aspect, an included angle between a mirror surface normal direction of the $i^{th}$ reflector in the N reflectors and an emergent light beam of the $i^{th}$ reflector in the N reflectors is equal to an included angle between a mirror surface normal direction of the $(i+1)^{th}$ reflector in the N reflectors and an emergent light beam of the $(i-1)^{th}$ reflector in the N reflectors, where i is a positive integer less than or equal to N. In this embodiment of this application, the $i^{th}$ reflector and the $(i+1)^{th}$ reflector in the N reflectors are two adjacent reflectors, and both the emergent light beam of the $i^{th}$ reflector and the emergent light beam of the $(i+1)^{th}$ reflector are sent to the MEMS micromirror. The included angle between the mirror surface normal direction of the $i^{th}$ reflector in the N reflectors and the emergent light beam of the $i^{th}$ reflector in the N reflectors is a first included angle, and the included angle between the mirror surface normal direction of the $(i+1)^{th}$ reflector in the N reflectors and the emergent light beam of the $(i+1)^{th}$ reflector in the N reflectors is a second included angle. The first included angle is equal to the second included angle. That is, included angles between mirror surface normal directions of the N reflectors and emergent light beams of the N reflectors are the same, to ensure that the emergent light beams of the N reflectors are emitted onto the MEMS micromirror in a same direction. In this way, it is ensured that the MEMS micromirror can receive N emergent light beams from a same direction.

In a possible implementation of the first aspect, the MEMS micromirror is configured to: receive emergent light beams respectively sent by the N reflectors, change directions of the emergent light beams respectively sent by the N reflectors, and send the emergent light beams respectively corresponding to the N reflectors to implement two-dimensional scanning. Included angles between two adjacent emergent light beams in the N emergent light beams sent by the MEMS micromirror are equal. Specifically, the laser measurement module may include the N reflectors, and the N reflectors may emit the N emergent light beams. The MEMS micromirror is configured to: separately receive the emergent light beams sent by the N reflectors, change the directions of the emergent light beams respectively sent by the N reflectors to implement the two-dimensional, scanning, and send the emergent light beams respectively corresponding to the N reflectors. Included angles between emergent light beams, sent by two adjacent reflectors, in the emergent light beams that respectively correspond to the N reflectors and that are sent by the MEMS micromirror are equal. That is, included angles between the N emergent light beams sent by the MEMS micromirror are equal.

In a possible implementation of the first aspect, the N laser ranging components are parallel to each other. In other words, the N laser ranging components in the laser measurement module are parallel to each other, so that the plurality of laser ranging components are conveniently disposed in the laser measurement module, provided that the plurality of laser ranging components are in parallel to each other. Therefore, internal components of the laser measurement module provided in the embodiments of this application are more compact, and miniaturization of the laser measurement module is implemented.

In a possible implementation of the first aspect, the N laser ranging components and the MEMS micromirror are located on a same side of the reflector. The N laser ranging components are symmetrically distributed on left and right sides of the MEMS micromirror by using the MEMS micromirror as a center.

In the laser measurement module, the MEMS micromirror may be used as the center, and the N laser ranging components are symmetrically distributed on the left and the right sides. For example, if the value of N is an even number, first N/2 laser ranging components may be located in a left half plane using the MEMS micromirror as the center, and the other N/2 laser ranging components may be located in a right half plane using the MEMS micromirror as the center. In this way, the N laser ranging modules are symmetrically distributed on the left and right sides. For another example, if the value of N is an odd number, first (N−1)2 laser ranging components may be located in a left half plane using the MEMS micromirror as the center, an $((N+1)/2)^{th}$ laser ranging component and the MEMS micromirror are located on a same vertical plane using the MEMS micromirror as the center, and the other (N−1)/2 laser ranging components may be located on a right half plane using the MEMS micromirror as the center. In this way, the N laser ranging modules are symmetrically distributed on the left and right sides.

In a possible implementation of the first aspect, an included angle θ between emergent light beams of two adjacent laser ranging components in the N laser ranging components on a horizontal plane has the following relationship with a horizontal swing angle χ of the MEMS micromirror:

$$\theta \leq 2\chi.$$

The horizontal swing angle χ of the MEMS micromirror and an included angle θ between emergent light beams of any adjacent laser ranging components on the horizontal plane need to meet the foregoing relationship. This can ensure that point cloud scanning tracks of a plurality of groups of laser ranging components are seamlessly spliced in a horizontal direction.

In a possible implementation of the first aspect, the quantity N of laser ranging components has the following relationship with a horizontal scanning angle φ of the laser measurement module, the horizontal swing angle χ of the MEMS micromirror, and the included angle θ between the emergent light beams of the two adjacent laser ranging components on the horizontal plane:

$$N \geq \frac{\varphi - 2\chi}{\theta}.$$

The horizontal scanning angle φ of the laser measurement module, the horizontal swing angle χ of the MEMS micromirror (a swing range of the MEMS micromirror is from −χ/2 to χ/2), and the included angle θ between the emergent light beams of the adjacent laser ranging components on the horizontal plane meet the foregoing relationship. N needs to meet the foregoing constraint relationship to ensure a horizontal scanning angle range of the laser measurement module. For example, when the horizontal scanning angle θ of the laser measurement module is 106°, χ=8°, and θ=15°, the value of N may be 6 or 7.

In a possible implementation of the first aspect, a plane on which the N laser ranging components are located and a plane on which the MEMS micromirror is located are different planes. The N laser ranging components and a support are all fixed on a baseplate, and the MEMS micromirror is installed on the support. The plane on which the N laser ranging components are located and the plane on which the MEMS micromirror is located are different planes, so that the laser ranging components and the MEMS micromirror can be hierarchically placed. Therefore, a risk of blocking a vertical scanning angle by the laser ranging component can be effectively avoided, and a vertical scanning angle of the laser radar is maximized.

In a possible implementation of the first aspect, an included angle α between the incident light beam and the emergent light beam that are of each of the N laser ranging components and that are on the reflector on a vertical plane has the following relationship with a vertical inclination angle β of the MEMS micromirror and a vertical swing angle ω of the MEMS micromirror:

$$\alpha \geq \varepsilon(2\beta + \omega).$$

ε is an installation error factor of the reflector and the MEMS micromirror.

The vertical swing angle of the MEMS micromirror is ω, and a swing range of the MEMS micromirror is from −ω/2 to ω/2. To ensure that a scanning angle of the laser radar is not blocked in a vertical direction, α, β and ω meet the foregoing relationship. ε is the installation error factor of the reflector and the MEMS micromirror, and ε is determined based on an installation error caused by overall dimensions of the reflector and the MEMS micromirror. For example, a value of ε may be any value from 1.05 to 1.3, and a specific value of ε is not limited. For example, when α=20°, β=5°, ω=15°, and ε=1, a vertical scanning angle range of the laser radar is from −5° to 25°, to be specific, the vertical scanning angle is 30°. In this case, no angle blocking occurs.

In a possible implementation of the first aspect, included angles α of incident light beams and emergent light beams that are of the N laser ranging components and that are on the reflector on the vertical plane are equal. α is greater than or equal to 10° and less than or equal to 50°.

In a possible implementation of the first aspect, the vertical inclination angle β of the MEMS micromirror is greater than or equal to 5° and less than or equal to 45°.

The included angle α between the incident light beam and the emergent light beam that are of the laser ranging component and that are on the reflector on the vertical plane should be controlled in a range from 10° to 50°. For example, the included angle α is 20°, 25°, or 40°. A value range of the inclination angle β of the MEMS micromirror is from 5° to 45°. For example, the included angle β is 10°, 15°, or 30°. α ranges from 10° to 50°, and β ranges from 5° to 45°. If angles of α and β are too small, a distance between the MEMS micromirror and the reflector increases, and a volume of the laser radar increases. If angles of α and β are too large, an angle of the incident light beam on the MEMS micromirror is also very large, and a point cloud scanned image is distorted. Therefore, α ranges from 10° to 50°, and β ranges from 5° to 45°, so that the volume of the laser radar can be reduced, and distortion of the point cloud scanned image can be avoided.

In a possible implementation of the first aspect, the quantity of reflectors is M, and M is a positive integer. When N is equal to M, the laser ranging component one-to-one corresponds to the reflector. In other words, the N reflectors may be disposed in the laser measurement module. Because the N laser ranging components are disposed in the laser measurement module, each laser ranging component may use a dedicated reflector, to send the emergent light beam of the laser ranging component and receive the echo light beam of the laser ranging component.

In a possible implementation of the first aspect, the quantity of reflectors is M, and M is a positive integer. When N is greater than M, at least two of the N laser ranging components correspond to a same reflector. In other words, the M (M is not equal to N) reflectors may be disposed in the laser measurement module. Because the N laser ranging components are disposed in the laser measurement module, and N is greater than M, at least two laser ranging components definitely share a same reflector in the laser measurement module, and each laser ranging component may use a corresponding reflector, to send the emergent light beam of the laser ranging component and receive the echo light beam of the laser ranging component.

In a possible implementation of the first aspect, each of the N laser ranging components includes a laser, a spectroscope, and a detector. The laser is configured to generate the emergent light beam, where the emergent light beam is emitted onto the reflector through the spectroscope. The spectroscope is configured to receive the echo light beam emitted by the reflector, and emit the echo light beam onto the detector. The detector is configured to receive the echo light beam, and perform ranging based on the time difference between the emergent light beam and the echo light beam. The laser, the spectroscope, and the detector are disposed in each laser ranging component. The laser may be configured to generate a light beam, and the light beam is defined as the emergent light beam. In this embodiment of this application, the emergent light beam generated by the laser is not directly emitted onto the MEMS micromirror, but the emergent light beam is first emitted onto the reflector through the spectroscope. The reflector may perform the optical path reflecting, and the emergent light beam nay be emitted onto the MEMS micromirror through the optical path reflecting of the reflector.

In a possible implementation of the first aspect, both the N laser ranging components and the MEMS micromirror are connected to a data processing circuit.

According to a second aspect, an embodiment of this application further provides a multi-thread micromirror laser radar. The multi-thread micromirror laser radar includes the laser measurement module according to any one of the first aspect and a data processing circuit, Both the N laser ranging components and the MEMS micromirror are connected to the data processing circuit. The data processing circuit is configured to separately obtain data from the N laser ranging components and the MEMS micromirror, and process the data.

The multi-thread mi laser radar provided in this embodiment of this application includes the laser measurement module and the data processing circuit, and both the N laser ranging components and the MEMS micromirror are connected to the data processing circuit. After separately obtaining the data from the N laser ranging components and the MEMS micromirror, the data processing circuit may process the data. The data processing circuit obtains a distance value of a target from the laser ranging component, and obtains an angle value of the target from the MEMS micromirror. Spatial coordinates of the target may be obtained through conversion based on the distance value and the angle value.

In a possible implementation of the second aspect, the multi-thread micromirror laser radar further includes a baseplate, a support, and a connecting rod. The N laser ranging components and the reflector are located on the baseplate. The support is located on the baseplate, and the MEMS micromirror is located on the support. Two ends of the connecting rod are respectively connected to the baseplate and the data processing circuit, and the connecting rod is configured to support the data processing circuit.

In a subsequent embodiment, a three-dimensional structure diagram of the multi-thread micromirror laser radar is provided. The baseplate, the support, and the connecting rod are described in detail by using a three-dimensional structure of the multi-thread micromirror laser radar. The N laser ranging components, the reflector, and the support are all fixed on the baseplate. The MEMS micromirror is located on the support, and the support is configured to elevate a position of the MEMS micromirror relative to a plane on which the baseplate is located, so that the MEMS micromirror and the N laser ranging components can be hierarchically disposed. In addition, the reflector and the support are disposed, so that a position relationship between the N laser ranging components, the reflector, and the MEMS micromirror can be adjusted, to implement optimal optical performance of the laser measurement module. An angle relationship of an emergent light beam between the N laser ranging components, the reflector, and the MEMS micromirror is described in a subsequent example.

In this embodiment of this application, the two ends of the connecting rod are respectively connected to the baseplate and the data processing circuit. The connecting rod is configured to support the data processing circuit, so that the data processing circuit and the baseplate may be hierarchically disposed, and the data processing circuit and the laser measurement module may be located in same three-dimensional space. Therefore, this promotes integration and compactness of the multi-thread micromirror laser radar and reduces manufacturing costs of the multi-thread micromirror laser radar.

The following uses an example to describe the multi-thread micromirror laser radar provided in this embodiment of this application. This embodiment of this application relates to a multi-thread micromirror laser radar, and a group of reflectors are disposed between a plurality of groups of laser ranging components and the MEMS micromirror, to implement an optical path connection. Therefore, the laser ranging components can be arranged symmetrically, and a system layout is more compact and flexible. In this way, the plurality of groups of laser ranging components and the MEMS micromirror can be hierarchically placed, thereby effectively avoiding blocking a scanning angle.

According to a third aspect, an embodiment of this application provides a laser scanning method implemented based on the laser measurement module according to the first aspect. The laser scanning method may include: emitting an emergent light beam of each of N laser ranging components onto a reflector; performing optical path reflecting on the emergent light beam, and emitting the reflected emergent light beam onto an MEMS micromirror; changing a direction of the emergent light beam to implement two-dimensional scanning; receiving an echo light beam from a target object by using the MEMS micromirror, then changing a direction of the echo light beam, and emitting the echo light beam onto the reflector, where the echo light beam is a light beam reflected by the emergent light beam emitted onto the target object; performing optical path reflecting on the echo light beam, and emitting the reflected echo light beam onto each of the N laser ranging components; and receiving the echo light beam by each of the N laser ranging components, and performing ranging based on a time difference between the emergent light beam and the echo light beam.

The laser scanning method provided in this embodiment of this application further includes: executing another method procedure based on the laser measurement module according to the first aspect. For details, refer to the function description of the composition structure of the laser measurement module in the first aspect. Details are not described herein again.

DESCRIPTION OF EMBODIMENTS

Embodiments of this application provide a laser measurement module and a laser radar, to improve integration and compactness of the laser measurement module, and effectively reduce manufacturing costs of the laser radar.

The following describes the embodiments of this application with reference to accompanying drawings.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
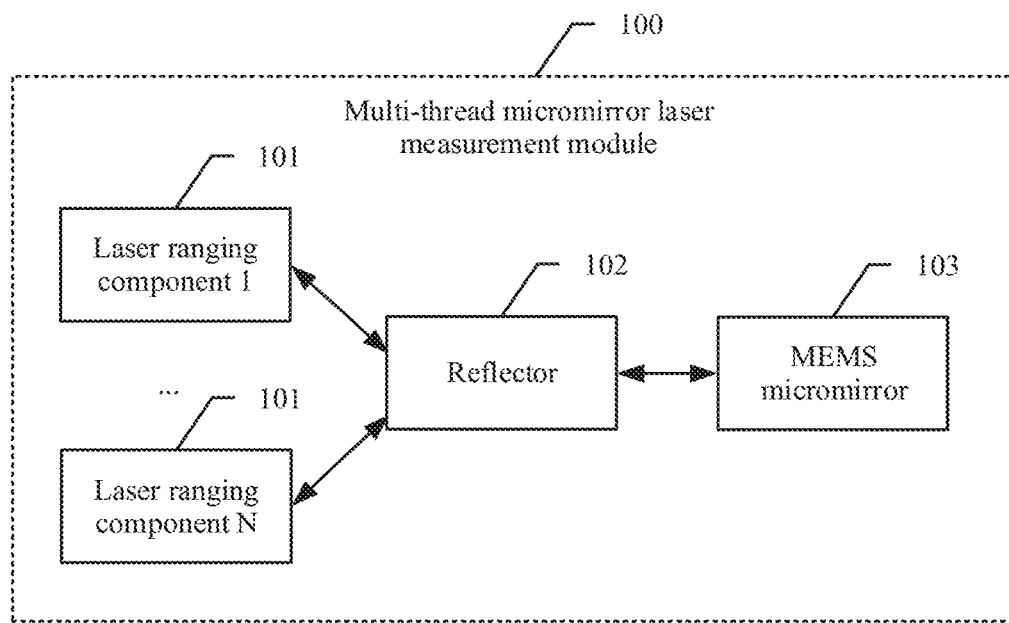
FIG. 1 is a schematic structural diagram of a multi-thread micromirror laser measurement module according to an embodiment of this application.

As shown in FIG. 1, an embodiment of this application provides a multi-thread micromirror laser measurement module 100. The multi-thread micromirror laser measurement module 100 includes N laser ranging components 101, a reflector 102, and one MEMS micromirror 103, where N is a positive integer greater than or equal to 2.

The N laser ranging components 101 each are configured to emit an emergent light beam onto the reflector 102.

The reflector 102 is configured to perform optical path reflecting on the emergent light beam, and emit the reflected emergent light beam onto the MEMS micromirror 103.

The MEMS micromirror 103 is configured to change a direction of the emergent light beam to implement two-dimensional scanning; and further configured to change a direction of an echo light beam, and emit the echo light beam onto the reflector 102, where the echo light beam is a light beam reflected by the emergent light beam emitted onto a target object.

The reflector 102 is further configured to perform optical path reflecting on the echo light beam and emit the reflected echo light beam onto each of the N laser ranging components 101.

The N laser ranging components 101 each are further configured to receive the echo light beam and perform ranging based on a time difference between the emergent light beam and the echo light beam.

The multi-thread micromirror laser measurement module provided in this embodiment of this application includes a plurality of laser ranging components and a quantity of laser ranging components is represented by N. For example, three laser ranging components may be disposed in the multi-thread micromirror laser measurement module. For another example, six laser ranging components may be disposed in the multi-thread micromirror laser measurement module. This depends on an application scenario. The laser ranging component is configured to generate a light beam, and the light beam is defined as the emergent light beam. In addition, in this embodiment of this application, the emergent light beam generated by each of the N laser ranging components is not directly emitted onto the MEMS micromirror, but the emergent light beam is first emitted onto the reflector by the laser ranging component. The reflector may perform the optical path reflecting, and the emergent light beam may be emitted onto the MEMS micromirror through the optical path reflecting of the reflector. Therefore, only one MEMS micromirror needs to be disposed, and a corresponding MEMS micromirror does not need to be disposed for each laser ranging component. The reflector is configured to implement an optical path connection between the plurality of laser ranging components and the single MEMS micromirror. This improves integration and compactness of the laser measurement module, effectively reduces manufacturing costs of a laser radar, and is applicable to a vehicular environment that has a strict requirement on a volume, a size, and costs.

In this embodiment of this application, after the emergent light beam is emitted from the MEMS micromirror, the emergent light beam is emitted onto the target object, to generate the echo light beam. The MEMS micromirror may further change the direction of the echo light beam, and emit the echo light beam onto each of the N laser ranging components by the reflector. Therefore, the N laser ranging components each may receive the echo light beam, and perform ranging based on the time difference between the emergent light beam and the echo light beam. A ranging algorithm used by the laser ranging component is not limited in this embodiment of this application. It should be understood that the time difference may be a time difference between a time at which the laser ranging component emits the emergent light beam and a time at which the laser ranging component receives the echo light beam.

In this embodiment of this application, the MEMS micromirror may change the direction of the emergent light beam to implement the two-dimensional scanning. The two-dimensional scanning means that the MEMS micromirror may swing in two directions that are perpendicular to each other, and two-dimensional scanning of the light beam is implemented through swinging of the MEMS micromirror.

In this embodiment of this application, the reflector may be a planar reflector or a prism plated with a metal film or a dielectric film, or may be an optical element that has a bidirectional light beam reflection function, for example, an optical grating or a nanometer optical antenna.

In this embodiment of this application, the N laser ranging components can share a same MEMS micromirror. The emergent light beam generated by the laser ranging component is not directly emitted onto the MEMS micromirror, but the emergent light beam is first emitted onto the reflector by the laser ranging component. The reflector may implement the optical path reflecting, and the emergent light beams of the N laser ranging components may be emitted onto the same MEMS micromirror through the optical path reflecting of the reflector. The emergent light beams of the N laser ranging components do not need to be directly emitted onto the MEMS micromirror, but need to be emitted onto the MEMS micromirror after being reflected by the reflector. Therefore, when the N laser ranging components and the MEMS micromirror are disposed in the multi-thread micromirror laser measurement module, a position relationship between the laser ranging components and the MEMS micromirror is flexible. Therefore, the multi-thread micromirror laser measurement module can implement a high-integration and more compact structure, and reduce manufacturing costs of the multi-thread micromirror laser measurement module. When the multi-thread micromirror laser measurement module is applied to a multi-thread micromirror laser radar, manufacturing costs of the multi-thread micromirror laser radar can be reduced.

In some embodiments of this application, the N laser ranging components and the MEMS micromirror are located on a same side of the reflector. Further, the N laser ranging components are symmetrically distributed on left and right sides of the MEMS micromirror by using the MEMS micromirror as a center. In the multi-thread micromirror laser measurement module, the MEMS micromirror may be used as the center, and the N laser ranging components are symmetrically distributed on the left and the right sides. For example, if a value of N is an even number, first N/2 laser ranging components may be located in a left half plane using the MEMS micromirror as the center, and the other N/2 laser ranging components may be located in a right half plane using the MEMS micromirror as the center. In this way, the N laser ranging modules are symmetrically distributed on the left and right sides. For another example, if a value of N is an odd number, first (N−1)/2 laser ranging components may be located in a left half plane using the MEMS micromirror as the center, an (N+1)/2 laser ranging component and the MEMS micromirror are located on a same vertical plane using the MEMS micromirror as the center, and the other (N−1)/2 laser ranging components may be located on a right half plane using the MEMS micromirror as the center. In this way, the N laser ranging modules are symmetrically distributed on the left and right sides.

Figure 2:
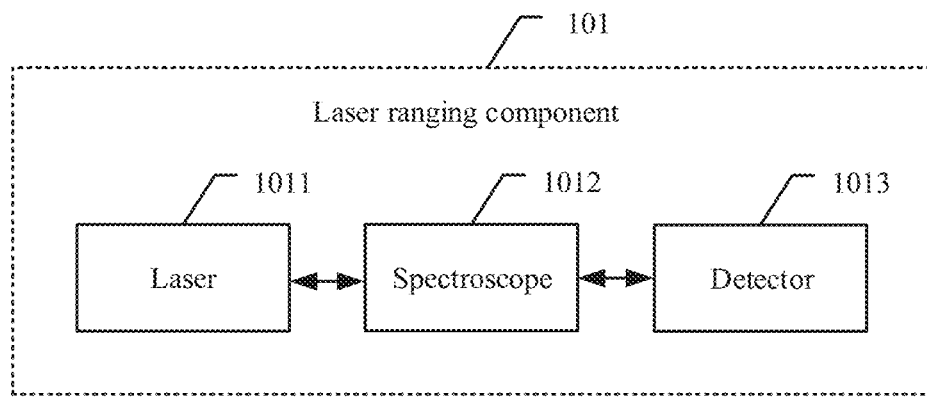
FIG. 2 is a schematic structural diagram of a laser ranging component according to an embodiment of this application.

In some embodiments of this application, FIG. 2 is a schematic structural diagram of a laser ranging component according to an embodiment of this application. Each of the N laser ranging components 101 includes a laser 1011, a spectroscope 1012, and a detector 1013.

The laser 1011 is configured to generate the emergent light beam, where the emergent light beam is emitted onto the reflector through the spectroscope.

The spectroscope 1012 is configured to receive the echo light beam emitted by the reflector, and emit the echo light beam onto the detector 1013.

The detector 1013 is configured to receive the echo light beam, and perform ranging based on the time difference between the emergent light beam and the echo light beam.

The laser, the spectroscope, and the detector are disposed in each laser ranging component. The laser may be configured to generate a light beam, and the light beam is defined as the emergent light beam. In this embodiment of this application, the emergent light beam generated by the laser is not directly emitted onto the MEMS micromirror, but the emergent light beam is first emitted onto the reflector through the spectroscope. The reflector may perform the optical path reflecting, and the emergent light beam may be emitted onto the MEMS micromirror through the optical path reflecting of the reflector. A type of the spectroscope is not limited in this embodiment of this application.

In this embodiment of this application, after the emergent light beam is emitted from the MEMS micromirror, the emergent light beam is emitted onto the target object, to generate the echo light beam. The MEMS micromirror may further change the direction of the echo light beam, and the echo light beam is emitted onto the spectroscope by the reflector. The spectroscope may receive the echo light beam, and emit the echo light beam onto the detector. Finally, the detector performs ranging based on the time difference between the emergent light beam and the echo light beam. A ranging algorithm used by the detector is not limited in this embodiment of this application.

In some embodiments of this application, a quantity of reflectors disposed in the multi-thread micromirror laser measurement module is M, and M is an integer. For example, M is a positive integer. When N is equal to M, the laser ranging component one-to-one corresponds to the reflector. In other words, N reflectors may be disposed in the multi-thread micromirror laser measurement module. Because the N laser ranging components are disposed in the multi-thread micromirror laser measurement module, each laser ranging component may use a dedicated reflector, to send the emergent light beam of the laser ranging component and receive the echo light beam of the laser ranging component.

Without limitation, in some other embodiments of this application, a quantity of reflectors disposed in the multi-thread micromirror laser measurement module is M, and M may be a positive integer. When N is greater than M, at least two of the N laser ranging components correspond to a same reflector. In other words, M (M is not equal to N) reflectors may be disposed in the multi-thread micromirror laser measurement module. Because the N laser ranging components are disposed in the multi-thread micromirror laser measurement module, and N is greater than M, at least two laser ranging components definitely share a same reflector in the multi-thread micromirror laser measurement module, and each laser ranging component may use a corresponding reflector, to send the emergent light beam of the laser ranging component and receive the echo light beam of the laser ranging component. In a subsequent embodiment, a case in which a plurality of reflectors are disposed in the multi-thread micromirror laser measurement module is described in detail.

In some embodiments of this application, both the N laser ranging components and the MEMS micromirror are connected to a data processing circuit. A data processing algorithm used by the data processing circuit may be configured based on a specific requirement of the laser radar, and algorithms used for data processing are not described one by one herein.

Figure 3:
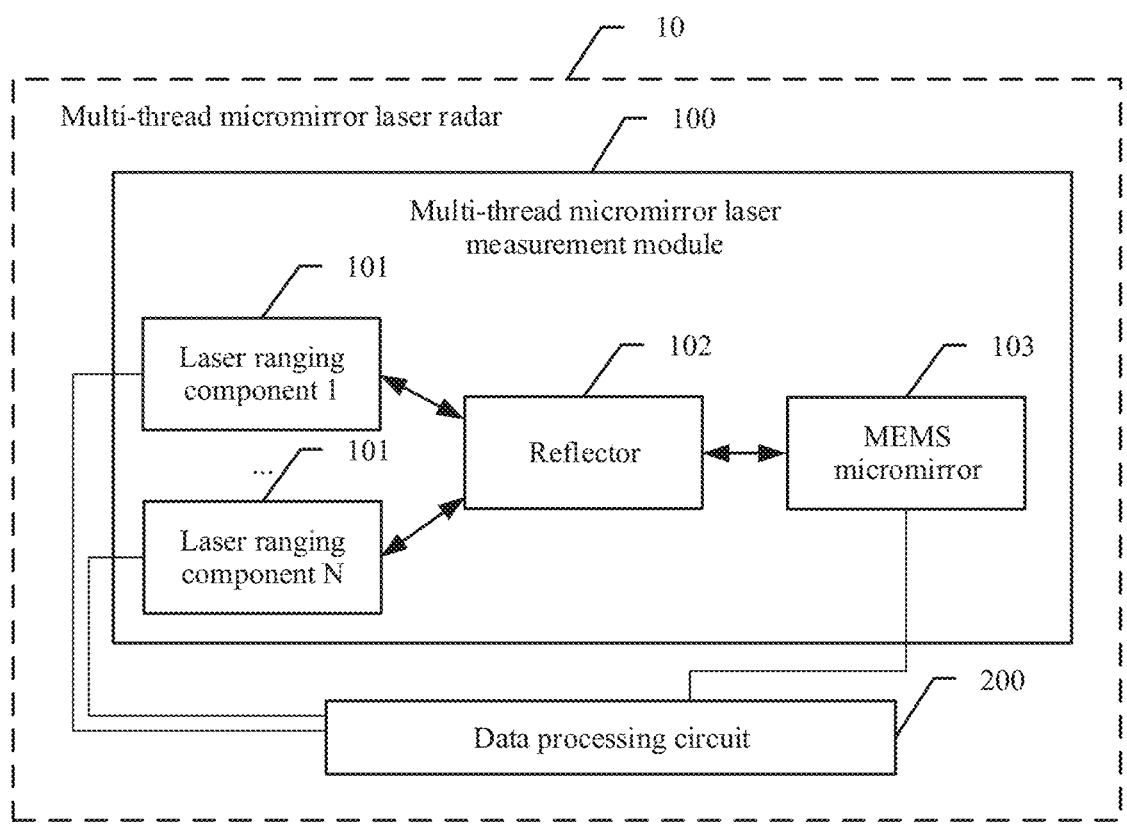
FIG. 3 is a schematic structural diagram of a multi-thread micromirror laser radar according to an embodiment of this application.

The foregoing embodiments describe in detail the multi-thread micromirror laser measurement module. The following describes, by using an example, a multi-thread micromirror laser radar 10 provided in an embodiment of this application. As shown in FIG. 3, the multi-thread micromirror laser radar 10 includes the multi-thread micromirror laser measurement module 100 as described in the foregoing embodiments and a data processing circuit 200.

The multi-thread micromirror laser measurement module 100 includes N laser ranging components 101, a reflector 102, and one MEMS micromirror 103.

Both the N laser ranging components 101 and the MEMS micromirror 103 are connected to the data processing circuit 200.

The reflector 102 is configured to reflect an emergent light beam of each of the N laser ranging components 101 onto the MEMS micromirror 103; and perform optical path reflecting on an echo light beam, and emit the reflected echo light beam onto each of the N laser ranging components 101.

The data processing circuit 200 is configured to separately obtain data from the N laser ranging components 101 and the MEMS micromirror 103, and process the data.

The multi-thread micromirror laser radar provided in this embodiment of this application includes the multi-thread micromirror laser measurement module and the data processing circuit, and both the N laser ranging components and the MEMS micromirror are connected to the data processing circuit. After separately obtaining the data from the N laser ranging components and the MEMS micromirror, the data processing circuit may process the data. The data processing circuit obtains a distance value of a target from the laser ranging component, and obtains an angle value of the target from the MEMS micromirror. Spatial coordinates of the target may be obtained through conversion based on the distance value and the angle value. A data processing algorithm used by the data processing circuit may be configured based on a specific requirement of the laser radar, and algorithms used for data processing are not described one by one herein.

In some embodiments of this application, in addition to the multi-thread micromirror laser measurement module and the data processing circuit, the multi-thread micromirror laser radar further includes a baseplate, a support, and a connecting rod.

The N laser ranging components and the reflector are located on the baseplate;

The support is located on the baseplate, and the MEMS micromirror is located on the support.

Two ends of the connecting rod are respectively connected to the baseplate and the data processing circuit, and the connecting rod is configured to support the data processing circuit.

In a subsequent embodiment, a three-dimensional structure diagram of the multi-thread micromirror laser radar is provided. The baseplate, the support, and the connecting rod are described in detail by using a three-dimensional structure of the multi-thread micromirror laser radar. The N laser ranging components, the reflector, and the support are all fixed on the baseplate. The MEMS micromirror is located on the support, and the support is configured to elevate a position of the MEMS micromirror relative to a plane on which the baseplate is located, so that the MEMS micromirror and the N laser ranging components can be hierarchically disposed. In addition, the reflector and the support are disposed, so that a position relationship between the N laser ranging components, the reflector, and the MEMS micromirror can be adjusted, to implement optimal optical performance of the laser measurement module. A relationship of an emergent light beam between the N laser ranging components, the reflector, and the MEMS micromirror is described in a subsequent example.

In this embodiment of this application, the two ends of the connecting rod are respectively connected to the baseplate and the data processing circuit. The connecting rod is configured to support the data processing circuit, so that the data processing circuit and the baseplate may be hierarchically disposed, and the data processing circuit and the multi-thread micromirror laser measurement module may be located in same three-dimensional space. Therefore, this promotes integration and compactness of the multi-thread micromirror laser radar and reduces manufacturing costs of the multi-thread micromirror laser radar.

The following uses an example to describe the multi-thread micromirror laser radar provided in this embodiment of this application. This embodiment of this application relates to a multi-thread micromirror laser radar, and a group of reflectors are disposed between a plurality of groups of laser ranging components and the MEMS micromirror, to implement an optical path connection. Therefore, the laser ranging components can be arranged symmetrically, and a system layout is more compact and flexible. In this way, the plurality of groups of laser ranging components and the MEMS micromirror can be hierarchically placed, thereby effectively avoiding blocking a scanning angle.

Figure 4:
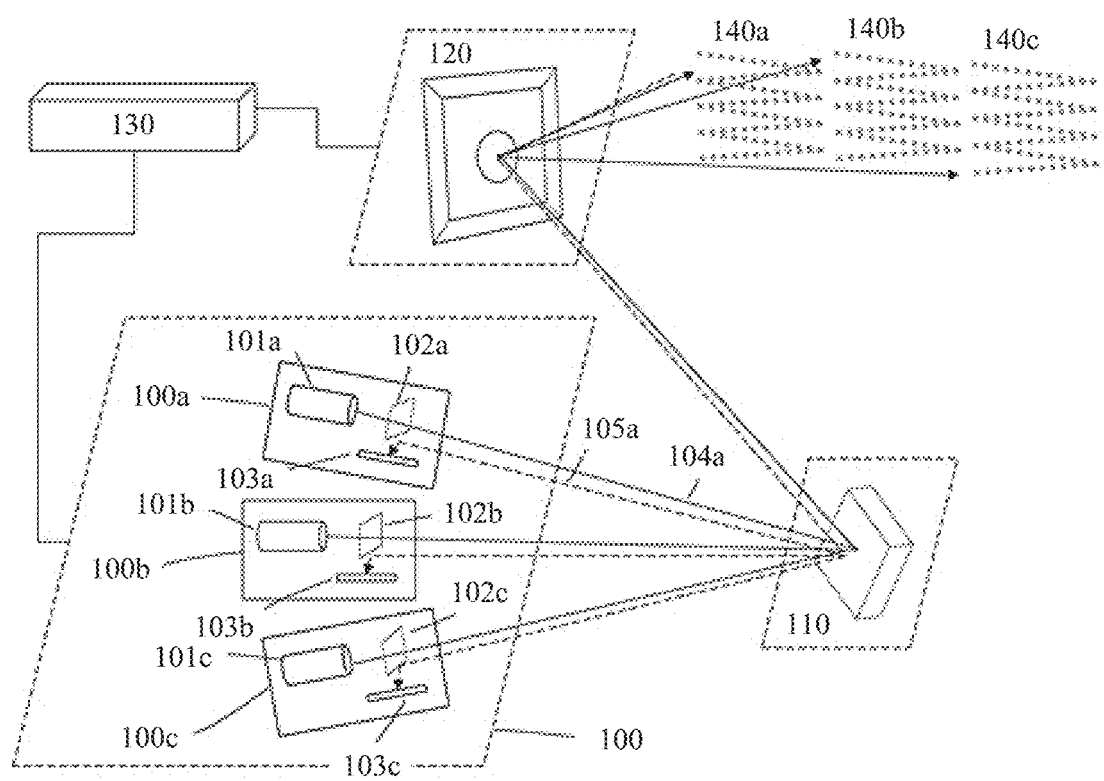
FIG. 4 is a schematic diagram of a propagation path of a light beam in a multi-thread micromirror laser radar according to an embodiment of this application.

This embodiment of this application relates to a multi-thread micromirror laser radar. As shown in FIG. 4, an example in which a quantity N of laser ranging components included in the laser radar is 3 is used for description. n groups (n=3 in the example) of laser ranging components respectively being 100a, 100, and 100c, a reflector 110, an MEMS micromirror 120, and a data processing circuit 130 are included. Configurations of the n groups of laser ranging components are completely the same. 100a is used as an example. 100a mainly includes a laser 101a, a spectroscope 102a, and a detector 103a. Similarly, 100b mainly includes a laser 101b, a spectroscope 102b, and a detector 103b, and 100c mainly includes a laser 101c, a spectroscope 102c, and a detector 103c. An emergent light beam 104a in the laser ranging component 100a is emitted onto the reflector 110. The reflector 110 performs optical path reflecting, and emits the reflected light beam onto the MEMS micromirror 120. The MEMS micromirror 120 implements scanning of the light beam 140a through two-dimensional swinging. Similarly, a light beam 140b generated by the laser ranging component 100b is emitted onto the MEMS micromirror 120, and a light beam 140c generated by the laser ranging component 100c is emitted onto the MEMS micromirror 120. The MEMS micromirror 120 implements scanning of the light beam 140b and the light beam 140c through two-dimensional swinging. The emergent light beam 104a whose direction is adjusted by the MEMS micromirror 120 hits a target object. An echo light beam 105a of the emergent light beam 104a returns along an original path, and is received by the detector 103a after passing through the MEMS micromirror 120, the reflector 110, and the spectroscope 102a. The three groups of laser ranging components 100a, 100b, and 100c have a same structure, and emit laser light beams in a time division manner. The data processing circuit 130 is configured for control and data processing of then groups of laser ranging components 100a, 100b, and 100c and the MEMS micromirror 120.

In this embodiment of this application, a group of reflectors 110 are disposed between the n groups of laser ranging components (1-N) 100 and the MEMS micromirror 120, so that a layout of the laser radar is more compact, and space utilization is higher. Because the reflector has an light beam reflection function, a plurality of groups of laser ranging components 100 and the MEMS micromirror 120 are placed on a same side, to promote cabling of a circuit board. In addition, the MEMS micromirror 120 may be used as a center, and the laser ranging components 100 are symmetrically arranged on two sides of the MEMS micromirror 120 by using the MEMS micromirror as the center, so that a structure of the laser radar is more beautiful, reasonable, and convenient. In this structure, a configuration of the laser radar may be flexibly adjusted by simply increasing or decreasing a quantity of laser ranging components 100. In addition, the reflector is added, and the laser ranging components 100 and the MEMS micromirror 120 can be hierarchically placed by using the light beam reflection function of the reflector. Therefore, a risk of blocking a scanning angle by the laser ranging components 100 can be effectively avoided, and the scanning angle of the laser radar is maximized. If no reflector is added, the plurality of components and the MEMS micromirror are placed on a same plane. If the plurality of components and the MEMS micromirror are too close to each other, a scanning angle may be blocked. If the plurality of components and the MEMS micromirror are too far away from each other, a structure of the entire laser radar is not compact enough. Therefore, the reflector needs to be added to fold an optical path, so as to implement hierarchical placement between the plurality of components and the MEMS micromirror.

Figure 5:
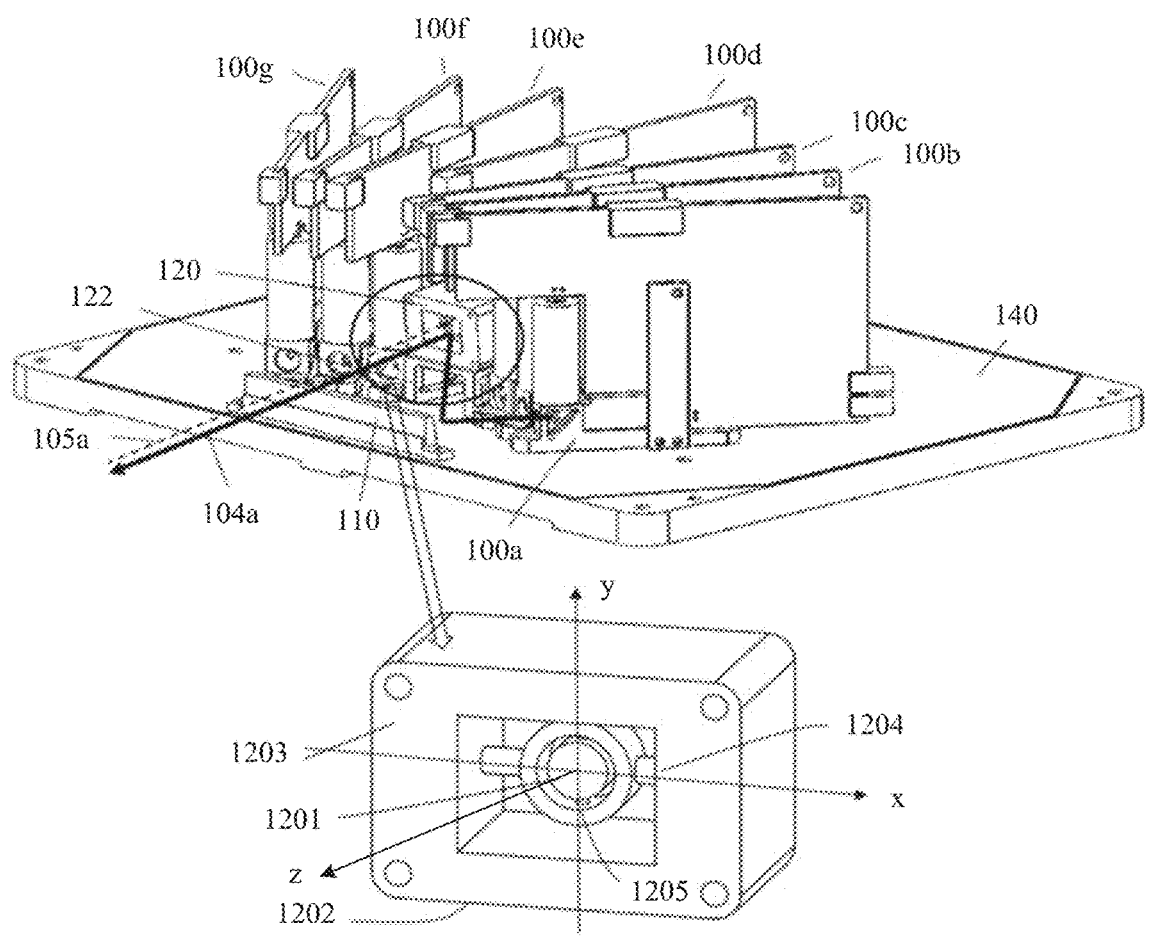
FIG. 5 is a schematic three-dimensional structural diagram of a multi-thread micromirror laser radar according to an embodiment of this application.

FIG. 5 is a schematic three-dimensional structural diagram of a multi-thread micromirror laser radar according to an embodiment of this application. Seven groups of laser ranging components (100a, 100b, 100c, 100d, 100e, 100f, and 100g) and a reflector 110 are placed on a baseplate 140. The laser ranging component 100a is used as an example. An emergent light beam 104a of the laser ranging component 100a is horizontally emitted onto the reflector 110. The reflector 110 reflects the emergent light beam 104a, and the reflected emergent light beam 104a is emitted onto an MEMS micromirror 120. Light beam scanning is implemented through two-dimensional swinging of the MEMS micromirror 120, and an echo light beam 105a scattered by a target object returns along an original optical path. Optical paths of the laser ranging modules are independent of each other and do not interfere with each other. A function of a support 122 is to elevate a position of the MEMS micromirror 120, so that the MEMS micromirror 120 and the laser ranging components may be hierarchically disposed.

In this embodiment of this application, the reflector 110 is used to connect the optical path, so that the MEMS micromirror 120 and n groups of laser ranging components 100 can be disposed on a same side, and the laser ranging components 100 and the MEMS micromirror 120 have a same cabling channel. This promotes circuit board wiring and heat dissipation of a laser ranging radar.

In this embodiment of this application, a coordinate system is established by using the MEMS micromirror 120 to describe a position relationship between the MEMS micromirror 120, the laser ranging components 100, and the reflector 110. In FIG. 5, the MEMS micromirror 120 is located in three-dimensional xyz space, an xz plane is a horizontal plane, and a yz plane is a vertical plane. The MEMS micromirror 120 mainly includes a mirror surface 1201, an outer frame bottom surface 1202, and an outer frame front surface 1203, a horizontal swing axis 1205, and a vertical swing axis 1204. The horizontal swing axis 1205 and the vertical swing axis 1204 are perpendicular to each other, and when the mirror surface 1201 is static, the mirror surface 1201 is parallel to the outer frame front surface 1203 and is perpendicular to the outer frame bottom surface 1202. For ease of description, a swing angle of the mirror surface 1201 is equivalent to a swing angle of the MEMS micromirror 120. To be specific, the MEMS micromirror 120 swings along the horizontal swing axis 1205, and a horizontal swing angle of the MEMS micromirror 120 is $\chi$. The MEMS micromirror 120 swings along the vertical swing axis 1204, and a vertical swing angle of the MEMS micromirror 120 is ω. Optionally, the horizontal swing angle and the vertical swing angle may be swing angles supported by the MEMS micromirror 120 in a normal working state.

Figure 6:
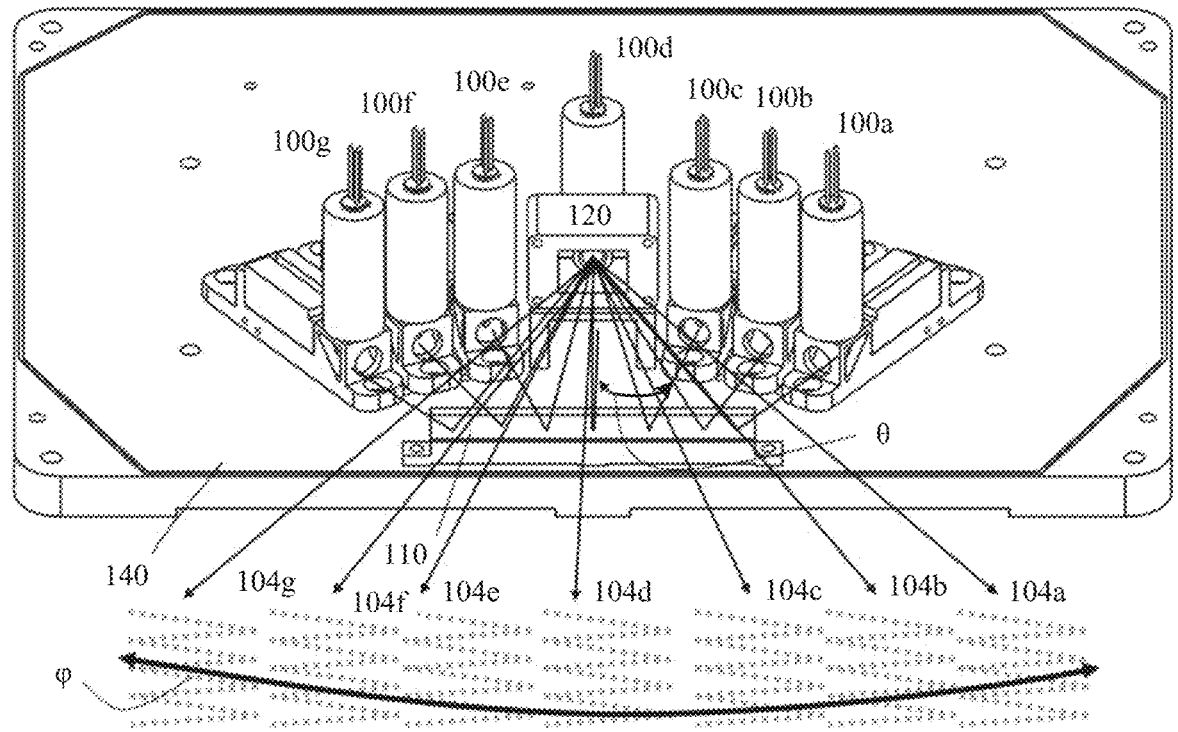
FIG. 6 is a schematic diagram of a horizontal scanning range of a multi-thread micromirror laser radar according to an embodiment of this application.

In this embodiment of this application, the reflector 110 is used to enable a plurality of groups of laser ranging components 100 to be symmetrically arranged on left and right sides of the baseplate 140 by using the MEMS micromirror 120 as a center (for example, it may be considered that the horizontal swing axis 1205 of the MEMS micromirror is used as the center). For details, refer to FIG. 6. In FIG. 6, there are a total of seven groups of laser ranging components. The laser ranging components 100*d* are in the middle, the laser ranging components 100*a*, 100*b*, and 100*c*, and the laser ranging components 100*e*, 100*f*, and 100*g* are symmetrically arranged on two sides of the laser ranging component 100*d*. An included angle between emergent light beams of adjacent laser ranging modules on a horizontal plane can be flexibly designed to meet a requirement of a specified horizontal scanning angle. For example, when the horizontal swing angle of the MEMS micromirror is 10°, one laser ranging component works with one MEMS micromirror to measure a horizontal angle of 20°. Three laser ranging components share one MEMS micromirror to perform horizontal angle splicing, and a horizontal angle of 60° is achieved. If the horizontal swing angle of the MEMS micromirror is changed to 5°, one laser ranging component works with one MEMS micromirror to measure only a horizontal angle of 10°. Six laser ranging components share one MEMS micromirror to perform horizontal angle splicing, and a horizontal angle of 60° can also be achieved under this condition. However, resolution of the laser radar under this condition can be doubled compared with resolution of the laser radar when the horizontal swing angle of the MEMS micromirror is 10°. This is because a quantity of laser ranging components is increased from 3 to 6. Emergent light beams 104*a*, 104*b*, 104*c*, 104*d*, 104*e*, 104*f*, and 104*g* of the seven groups of laser ranging components 100 respectively scan different areas, and are angle-spliced in a horizontal direction. For details, refer to FIG. 6.

In some embodiments of this application, with reference to FIG. 5, the foregoing three-dimensional spatial coordinate system is defined by using the MEMS micromirror as the center, and an included angle θ between emergent light beams of two adjacent laser ranging components in N laser ranging components on the horizontal plane has the following relationship with the horizontal swing angle χ of the MEMS micromirror:

$$\theta \leq 2\chi.$$

As shown in FIG. 6, for example, an included angle between emergent light beams of the laser ranging component 100*c* and the laser ranging component 100*d* on the horizontal plane is θ. The horizontal swing angle χ of the MEMS micromirror and an included angle θ between emergent light beams of any adjacent laser ranging components on the horizontal plane need to meet the foregoing relationship. This can ensure that point cloud scanning tracks of a plurality of groups of laser ranging components are seamlessly spliced in the horizontal direction.

In some embodiments of this application, the quantity N of the laser ranging components has the following relationship with a horizontal scanning angle φ a multi-thread micromirror laser measurement module, the horizontal swing angle χ of the MEMS micromirror, and the included angle θ between the emergent light beams of the two adjacent laser ranging components on the horizontal plane:

$$N \geq \frac{\varphi - 2\chi}{\theta}.$$

As shown in FIG. 6, for example, the included angle between the emergent light beams of the laser ranging component 100*c* and the laser ranging component 100*d* on the horizontal plane is θ, the horizontal scanning angle of the multi-thread micromirror laser measurement module is φ, and the quantity of used laser ranging components is N. The horizontal scanning angle φ of the multi-thread micromirror laser measurement module, the horizontal swing angle χ of the MEMS micromirror 120 (a swing range of the MEMS micromirror is from −χ/2 to χ/2), and the included angle θ between the emergent light beams of the adjacent laser ranging components on the horizontal plane meet the foregoing relationship. N needs to meet the foregoing constraint relationship to ensure a horizontal scanning angle range of the multi-thread micromirror laser measurement module. For example, when the horizontal scanning angle φ of the laser measurement module is 106°, χ=8°, and θ=15°, a value of N may be 6 or 7. The quantity of laser ranging components may be determined by using the foregoing met relationship between the horizontal scanning angle φ of the multi-thread micromirror laser measurement module, the horizontal swing angle χ of the MEMS micromirror, and the included angle θ between the emergent light beams of the two adjacent laser ranging components on the horizontal plane.

In some embodiments of this application, a plane on which the N laser ranging components are located and a plane on which the MEMS micromirror is located are different planes. As shown in FIG. 5, the N laser ranging components and the support are all fixed on the baseplate, and the MEMS micromirror is installed on the support. The plane on which the N laser ranging components are located and the plane on which the MEMS micromirror is located are different planes, so that the laser ranging components and the MEMS micromirror can be hierarchically placed. Therefore, a risk of blocking a vertical scanning angle by the laser ranging component can be effectively avoided, and the vertical scanning angle of the laser radar is maximized.

Figure 7:
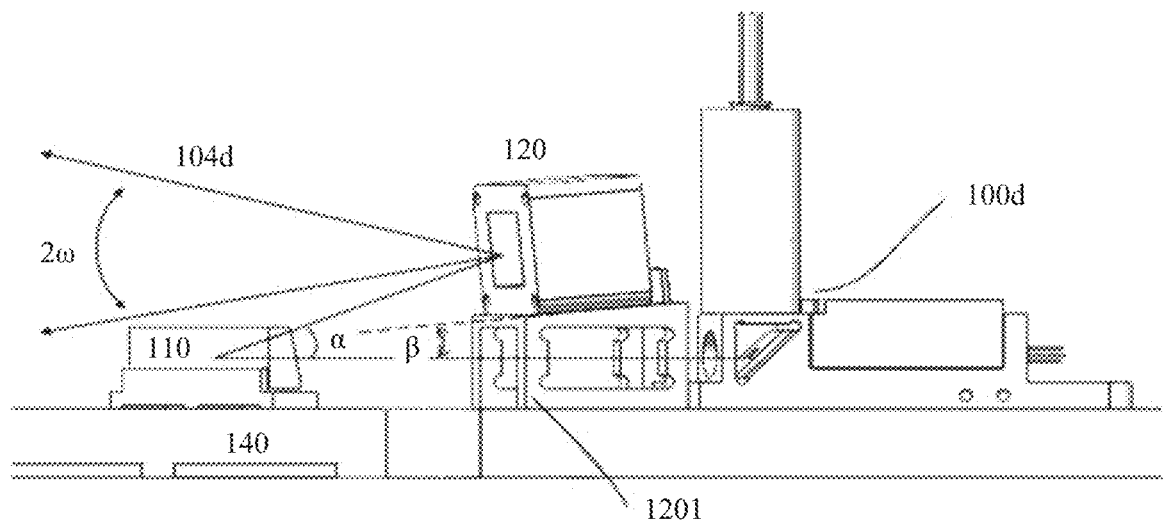
FIG. 7 is a schematic diagram of a relative position relationship between a laser ranging component and an MEMS micromirror according to an embodiment of this application.

In this embodiment of this application, another function of the reflector 110 is to effectively avoid blocking the vertical scanning angle. For details, refer to FIG. 7. In FIG. 7, the emergent light beam 104*d* of the laser ranging component 100*d* is horizontally emitted onto the reflector 110, and an included angle between the incident light beam and the emergent light beam that are on the reflector 110 on a vertical plane is α. To make the emergent light beam still emitted onto the MEMS micromirror 120, the MEMS micromirror needs to be elevated by using the support 122. The MEMS micromirror 120 and the laser ranging component 100*d* are hierarchically placed, so that angle blocking of the emergent light beam 104*d* is effectively avoided in vertical scanning.

When the outer frame bottom surface 1202 of the MEMS micromirror 120 is parallel to a plane of the baseplate 140, the included angle α between the incident light beam and the emergent light beam that are on the reflector on the vertical plane is a vertical incident angle of the emergent light beam 104*d* on the mirror surface 1201 of the MEMS micromirror. When the included angle α between the incident light beam and the emergent light beam that are on the reflector on the vertical plane is excessively large, a point cloud scanning track is distorted, and point cloud image quality is affected. To resolve this problem, in this embodiment of this application, the MEMS micromirror 120 may vertically incline downward by a fixed angle, namely, a vertical inclination angle β of the MEMS micromirror, along the vertical swing axis 1204 of the MEMS micromirror 120, to reduce an incident angle of the light beam on the mirror surface. The inclination angle β is related to α.

In some embodiments of this application, an included angle α between an incident light beam and an emergent light beam that are of each of the N laser ranging components and that are on the reflector on a vertical plane has the following relationship with the vertical inclination angle β of the MEMS micromirror and the vertical swing angle ω of the MEMS micromirror:

$$\alpha \geq \varepsilon(2\beta+\omega).$$

ε is an installation error factor of the reflector and the MEMS micromirror.

As shown FIG. 7, the vertical swing angle of the MEMS micromirror 120 is ω, and the swing range of the MEMS micromirror is front −ω/2 to ω/2. To ensure that a scanning angle of the laser radar is not blocked in a vertical direction, α, β and ω meet the foregoing relationship. ε is the installation error factor of the reflector and the MEMS micromirror, and ε is determined based on an installation error caused by overall dimensions of the reflector and the MEMS micromirror. For example, a value of ε may be any value front 1.05 to 1.3, and a specific value of ε is not limited. For example, when α=20°, β=5°, ω=15°, and ε=1, a vertical scanning angle range of the laser radar is from −5° to 25°, to be specific, the vertical scanning angle is 30°. In this case, no angle blocking occurs.

In some embodiments of this application, included angles α of incident light beams and emergent light beams that are of the N laser ranging components and that are on the reflector on the vertical plane are equal.

α is greater than or equal to 10° and less than or equal to 50°.

In some embodiments of this application, the vertical inclination angle β of the MEMS micromirror is greater than or equal to 5° and less than or equal to 45°.

The included angle α between the incident light beam and the emergent light beam that are of each of the N laser ranging components and that are on the reflector on the vertical plane should be controlled in a range from 10° to 50°. For example, the included angle α is 20°, 25°, or 40°. A value range of the vertical inclination angle β of the MEMS micromirror is from 5° to 45°. For example, the included angle β is 10°, 15°, or 30°. α ranges from 10° to 50°, and β ranges front 5° to 45°. If angles of α and β are too small, a distance between the MEMS micromirror and the reflector increases, and a volume of the laser radar increases. If angles of α and β are too large, an angle of the incident light beam on the MEMS micromirror is also very large, and a point cloud scanned image is distorted. Therefore, α ranges from 10° to 50°, and β ranges from 5° to 45°, so that the volume of the laser radar can be reduced, and distortion of the point cloud scanned image can be avoided.

Figure 8:
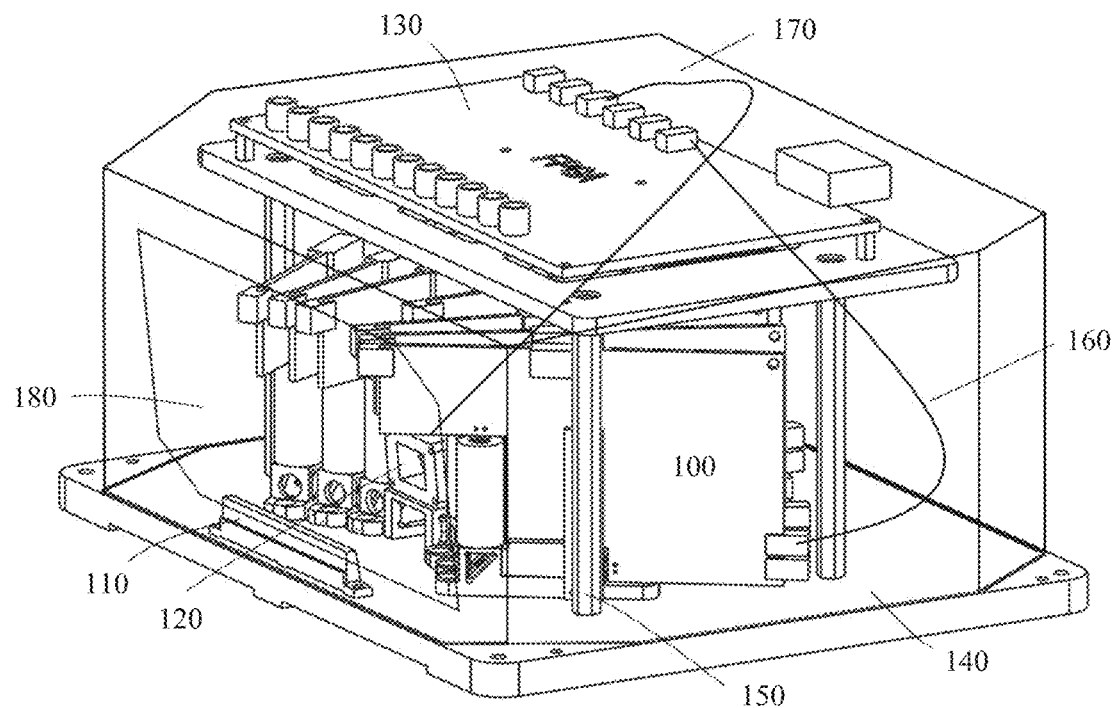
FIG. 8 is a schematic three-dimensional structural diagram of another multi-thread micromirror laser radar according to an embodiment of this application.

As shown in FIG. 8, spatial locations of the seven groups of laser ranging components 100, the reflector 110, and the MEMS micromirror 120 are designed to constitute the multi-thread micromirror laser radar. In FIG. 8, the laser ranging components 100, the reflector 110, the MEMS micromirror 120, and the support are disposed on the baseplate 140, A connecting rod 150 is configured to support a data processing circuit 130. The data processing circuit 130 is connected to the laser ranging component 100 through a cable 160. The data processing circuit 130 is connected to the MEMS micromirror 120 through a cable 170. The data processing circuit 130 is configured to control a component and transmit data. The emergent light beams of the seven groups of laser ranging components are emitted onto the target through a housing window 180.

The reflector in FIG. 5 to FIG. 8 is further illustrated. A specific function of the reflector 110 is to change a light beam direction angle. Both the emergent light beam 104a and the echo light beam 105a can be reflected at an angle through the reflector 110. The reflector 110 may be a planar reflector or a prism plated with a metal film or a dielectric film, or may be an optical element that has a bidirectional light beam reflection function, for example, an optical grating or a nanometer optical antenna.

Figure 9:
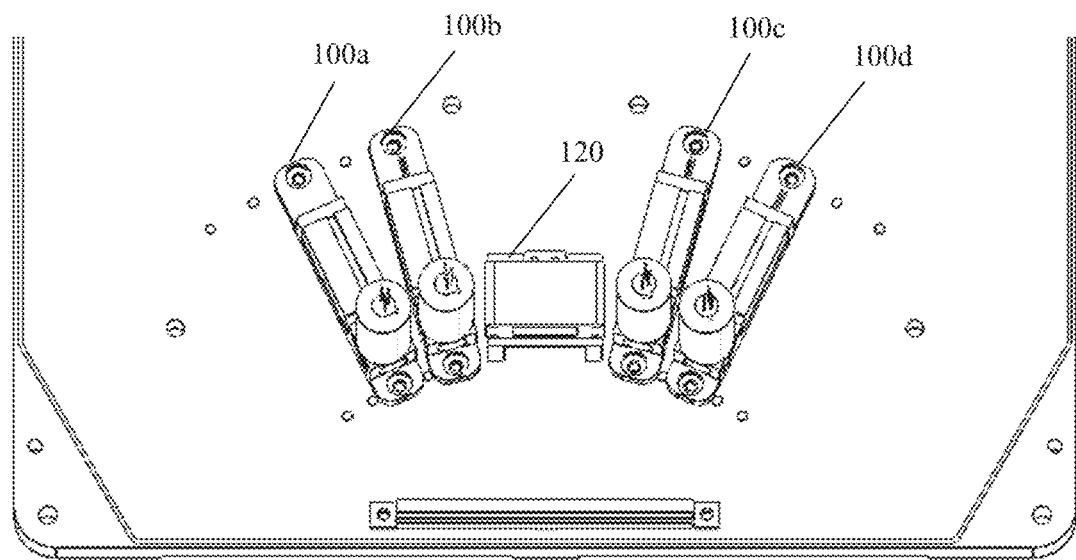
FIG. 9 is a schematic diagram of another relative position relationship between laser ranging components and an MEMS micromirror according to an embodiment of this application.
Figure 10:
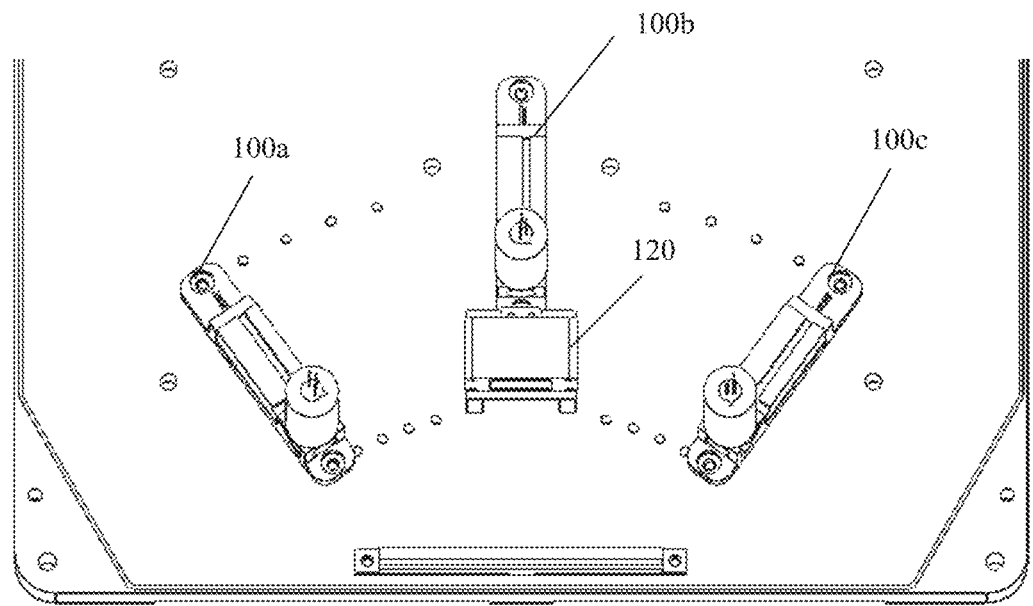
FIG. 10 is a schematic diagram of another relative position relationship between laser ranging components and an MEMS micromirror according to an embodiment of this application.

In some embodiments of this application, the quantity and placement locations of the laser ranging components may be flexibly changed, to flexibly adjust the scanning angle and the resolution of the laser radar. A larger quantity of used laser ranging components and a denser arrangement indicate higher point cloud resolution that the laser radar can obtain, but costs and a size increase accordingly. FIG. 9 and FIG. 10 respectively show optical path structures of the laser radar when four groups of laser ranging components are used and when three groups of laser ranging components are used. In FIG. 9, the laser ranging components 100a and 100b and the laser ranging components 100c and 100d are symmetrically distributed on left and right sides by using the MEMS micromirror 120 as the center. In FIG. 10, the laser ranging component 100a and the laser ranging component 100c are symmetrically distributed on left and right sides by using the MEMS micromirror 120 as the center, and the laser ranging component 100b and the MEMS micromirror 120 are located on a same vertical plane.

Figure 11:
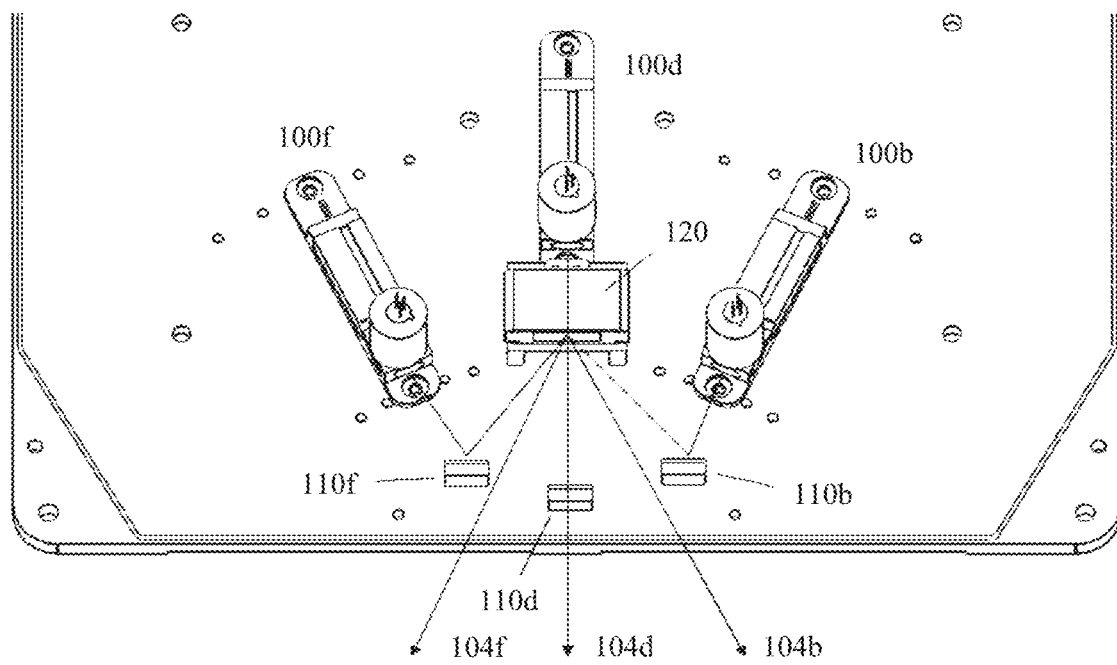
FIG. 11 is a schematic structural diagram of a plurality of reflectors disposed in a multi-thread micromirror laser radar according to an embodiment of this application.

In FIG. 5, FIG. 6, and FIG. 8, the plurality of groups of laser ranging components correspond to only one reflector 110. Sometimes, to reduce a size of the reflector 110, the reflector 110 may be split, so that each group of laser ranging components correspond to one reflector. For details, refer to FIG. 11. In FIG. 11, a total of three groups of laser ranging components 100b, 100d, and 100f are used, the emergent light beams 104b, 104d, and 104f of the three groups of laser ranging components respectively hit reflectors 110b, 110d, and 110f, and the emergent light beams are reflected and then emitted onto the MEMS micromirror 120.

Figure 12:
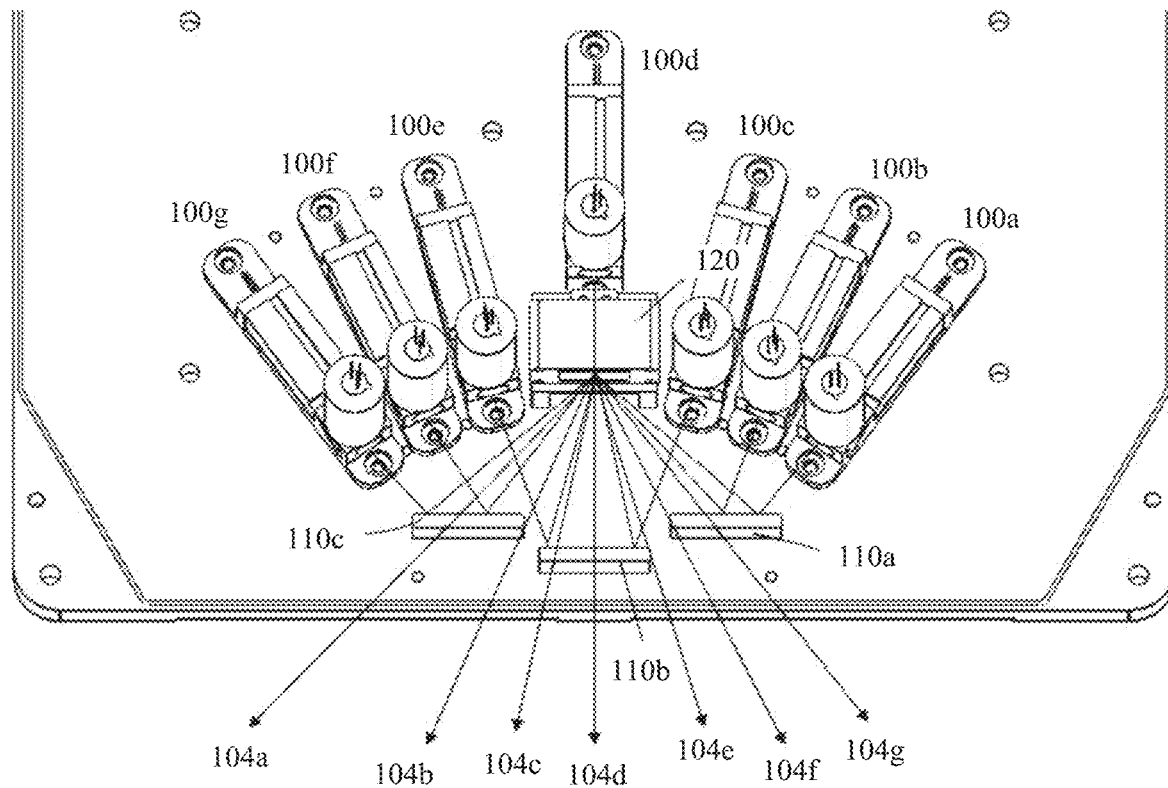
FIG. 12 is another schematic structural diagram of a plurality of reflectors disposed in a multi-thread micromirror laser radar according to an embodiment of this application.

In FIG. 12, the plurality of groups of laser ranging components may correspond to a plurality of reflectors. In FIG. 12, a total of seven groups of laser ranging components are used. The emergent light beams 104a and 104b of the laser ranging components 100a and 100b hit a reflector 110a. The emergent light beams 104c, 104d, and 104e of the laser ranging components 100c, 100d, and 100e hit the reflector 110b. The emergent light beams 104f and 104g of the laser ranging components 100f and 100g hit a reflector 110c. That is, a total of three reflectors are used to reflect the emergent light beams of the seven groups of laser ranging components, and the seven groups of light beams are guided to the MEMS micromirror 120.

An embodiment of this application provides a multi-thread micromirror laser radar. The multi-thread micromirror laser radar mainly includes a plurality of groups of laser ranging components, a reflector, a single MEMS micromirror and a data processing circuit. The reflector reflects emergent light beams of the plurality of groups of laser ranging components onto the MEMS micromirror, and light beam scanning is implemented through two-dimensional swinging of the MEMS micromirror. The reflector is configured to reflect an optical path, so that the MEMS micromirror and the plurality of groups of laser ranging components are disposed on a same side, and the plurality of groups of laser ranging components are symmetrically arranged on both sides of the MEMS micromirror. This helps to improve integration of a system. The reflector reflects, at a fixed angle, a light beam emitted by the laser ranging component, and a value of the light beam is 10° to 50°. Therefore, the plurality of groups of laser ranging components and the MEMS micromirrors are hierarchically placed, to avoid blocking a light beam scanning angle by the laser ranging component. The MEMS micromirror inclines downward at a fixed angle of 5° to 45°, to reduce an incident angle of the light beam on the MEMS micromirror, so that distortion of a point cloud image is avoided.

In addition, in this embodiment of this application, the plurality of groups of laser ranging components may share one or more reflectors.

The reflector may be a planar reflector or a prism plated with a metal film or a dielectric film, or may be an optical element that has a bidirectional light beam reflection function, for example, an optical grating or a nanometer optical antenna.

An application proposes a structure of a multi-thread micromirror laser radar. In the structure, an optical path connection between a plurality of groups of laser ranging components and a single MEMS micromirror is implemented through a reflector, so that integration and compactness of a laser radar system are greatly improved, and costs are effectively reduced. An embodiment of this application provides a multi-thread laser radar. A feature of the multi-thread laser radar is not represented on a single reflector, but the reflector is used to enable integration and compactness of an overall structure of the laser radar to be significantly improved.

Figure 13:
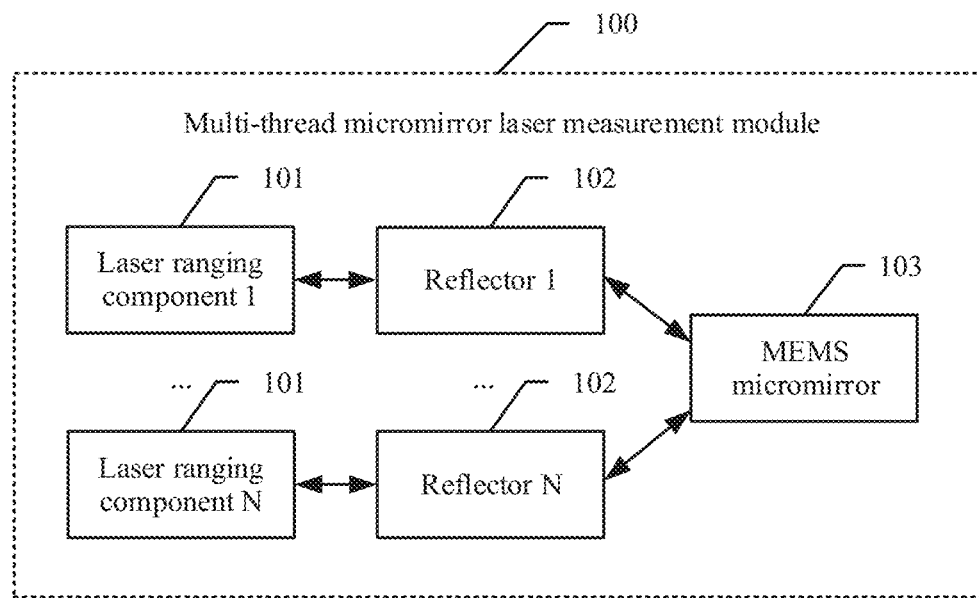
FIG. 13 is another schematic structural diagram of a laser ranging component according to an embodiment of this application.

As shown in FIG. 13, an embodiment of this application provides a multi-thread micromirror laser measurement module 100 (or simply laser measurement module 100). The laser measurement module 100 includes N laser ranging components 101, N reflectors 102, and an MEMS micromirror 103, where N is a positive integer greater than or equal to 2.

The N laser ranging components 101 one-to-one correspond to the N reflectors 102.

An emergent light beam of each of the N laser ranging components 101 is emitted onto a corresponding reflector 102 in the N reflectors 102.

Each of the N reflectors 102 is configured to perform optical path reflecting on an emergent light beam of a corresponding laser ranging component 101, and emit the reflected emergent light beam onto the MEMS micromirror 103.

The MEMS micromirror 103 is configured to: separately receive emergent light beams sent by the N reflectors, change directions of the emergent light beams respectively sent by the N reflectors, and send the emergent light beams respectively corresponding to the N reflectors, to implement scanning; and further configured to change a direction of an echo light beam, and emit the echo light beam onto a corresponding reflector 102. The echo light beam is a light beam reflected by the emergent light beam emitted onto a target object.

Each of the N reflectors 102 is configured to perform optical path reflecting on the echo light beam sent by the MEMS micromirror 103, and emit the reflected echo light beam onto the corresponding laser ranging component 101.

Each of the N laser ranging components 101 is further configured to receive the echo light beam sent by the corresponding reflector 102, and perform ranging based on a time difference between the emergent light beam emitted by each laser ranging component 101 and the received echo light beam.

The laser measurement module provided in this embodiment of this application includes a plurality of laser ranging components, and the quantity of laser ranging components is represented by N. For example, three laser ranging components may be disposed in the laser measurement module. For another example, six laser ranging components may be disposed in the laser measurement module. This depends on an application scenario. The laser ranging component is configured to generate a light beam, and the light beam is defined as the emergent light beam. In addition, in this embodiment of this application, the emergent light beam generated by each of the N laser ranging components is not directly emitted onto the MEMS micromirror, but the emergent light beam is first emitted onto the reflector by the laser ranging component. The reflector may perform the optical path reflecting, and the emergent light beam may be emitted onto the MEMS micromirror through the optical path reflecting of the reflector. Therefore, only one MEMS micromirror needs to be disposed, and a corresponding MEMS micromirror does not need to be disposed for each laser ranging component. The reflector is configured to implement an optical path connection between the plurality of laser ranging components and the single MEMS micromirror. This improves integration and compactness of the laser measurement module, effectively reduces manufacturing costs of a laser radar, and is applicable to a vehicular environment that has a strict requirement on a volume, a size, and costs.

The quantity of laser ranging components in the laser measurement module and a quantity of reflectors in the laser measurement module are equal. For example, the quantity of laser ranging components and the quantity of reflectors are both N. One laser ranging component corresponds to one reflector. To be specific, the emergent light beam of each laser ranging component is sent only to a reflector corresponding to the laser ranging component. Similarly, an echo light beam received by a reflector from the MEMS micromirror is also sent only to a laser ranging component corresponding to the reflector. In this embodiment of this application, the N laser ranging components share a same MEMS micromirror, and each laser ranging component corresponds to one completely independent reflector. In this way, a location of the laser ranging component in the laser measurement module may always be fixed, and a scanning angle, a light emission direction, an appearance, and the like of the laser radar may be changed by adjusting a design of the reflector. A flexible optical path architecture greatly improves application scalability of the laser radar. In addition, in this embodiment of this application, each laser ranging component may send the emergent light beam of the laser ranging component to the corresponding reflector. Therefore, the location of the laser ranging component is fixed, and only a passive reflector is adjusted to perform optical path calibration, to improve stability and convenience of optical path commissioning.

For example, the N laser ranging components are respectively a first laser ranging component, a second laser ranging component, . . . , and an $N^{th}$ laser ranging component. The N reflectors are respectively a first reflector, a second reflector, . . . , and an $N^{th}$ reflector. The following describes in detail light beam transmission between an $i^{th}$ laser ranging component and an $i^{th}$ reflector, where i is a positive integer less than or equal to N.

For example, an emergent light beam of the $i^{th}$ laser ranging component in the N laser ranging components is emitted onto the $i^{th}$ reflector in the N reflectors.

The $i^{th}$ reflector is configured to perform optical path reflecting on the emergent light beam of the $i^{th}$ laser ranging component and emit the reflected emergent light beam onto the MEMS micromirror.

The $i^{th}$ reflector is configured to perform optical path reflecting on an echo light beam sent by the MEMS micromirror and emit the reflected echo light beam onto the $i^{th}$ laser ranging component.

The $i^{th}$ laser ranging component is further configured to receive the echo light beam sent by the $i^{th}$ reflector and perform ranging based on a time difference between the emergent light beam emitted by the $i^{th}$ laser ranging component and the received echo light beam.

With reference to FIG. 13, each laser ranging component corresponds to one reflector. For example, the $i^{th}$ laser ranging component corresponds to the $i^{th}$ reflector. In this embodiment of this application, each laser ranging component may send the emergent light beam of the laser ranging component to the corresponding reflector. Therefore, the location of the laser ranging component is fixed, and only the passive reflector is adjusted to perform optical path calibration. For a ranging algorithm executed by the $i^{th}$ laser ranging component, refer to the description in the foregoing embodiment. Details are not described herein again.

In some embodiments of this application, a plurality of light beam diverting elements may further be disposed in the laser measurement module. The light beam diverting element is configured to divert a light beam received by the light beam diverting element. For example, the light beam diverting element has a light beam reflection function or a light beam refraction function, so that a direction of the light beam received by the element can be changed. In this embodiment of this application, the light beam diverting element may be disposed between the laser ranging component and the reflector. Without limitation, in this embodiment of this application, the light beam may be directly transmitted between the laser ranging component and the reflector. In other words, the light beam diverting element does not need to be used. Alternatively, the light beam may be transmitted between the laser ranging component and the reflector through the light beam diverting element. The following provides a detailed example for description.

It should be noted that, in this embodiment of this application, if the light beam may be transmitted between the laser ranging component and the reflector through the light beam diverting element, the light beam diverting element and the reflector may be collectively referred to as a reflector group. In a subsequent embodiment, an example in which the light beam diverting element and the reflector are collectively referred to as the reflector group is used for description.

Figure 14:
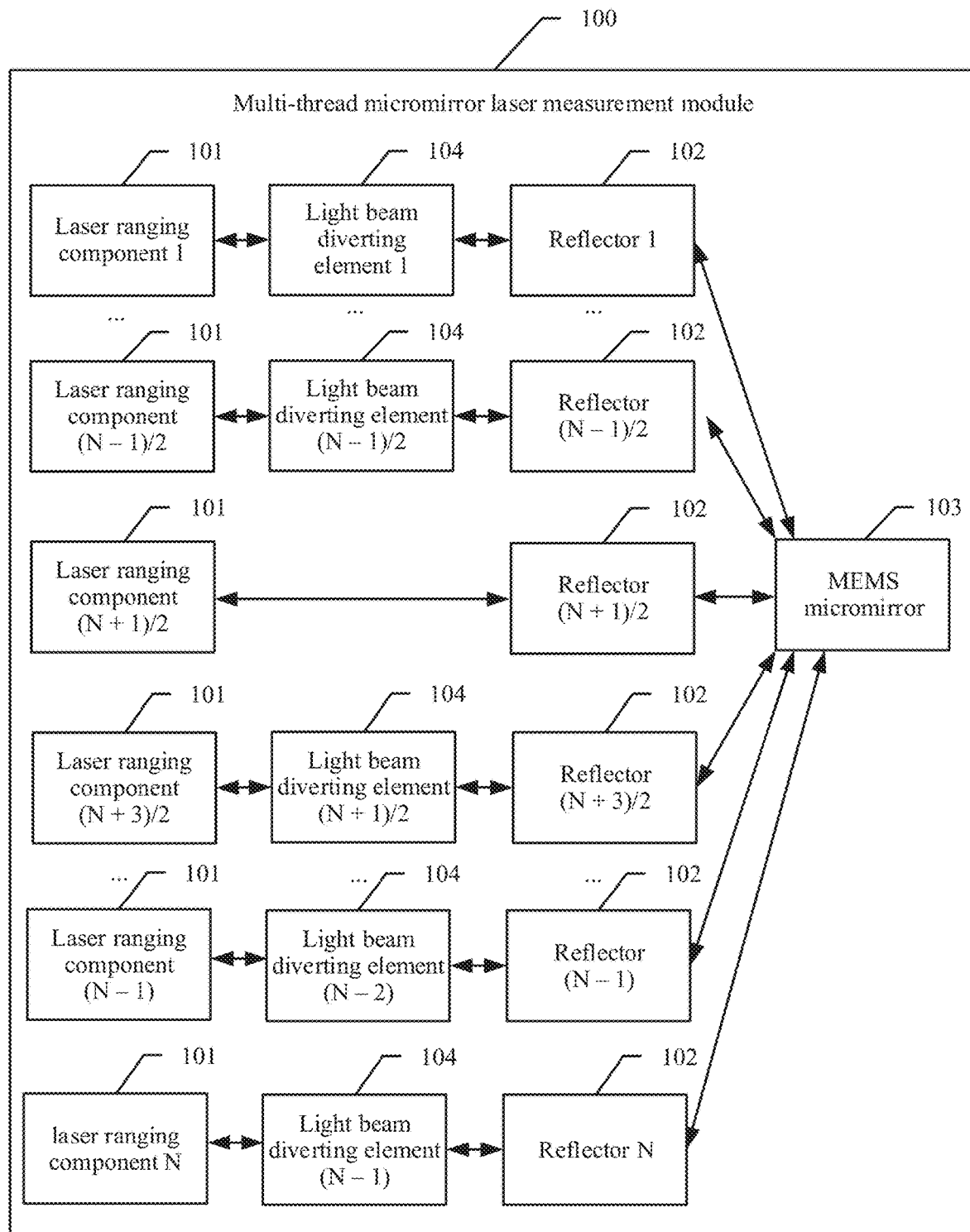
FIG. 14 is another schematic structural diagram of a laser ranging component according to an embodiment of this application.

In some embodiments of this application, referring to FIG. 14, an example in which N is greater than or equal to 7 is used for description in FIG. 14. Without limitation, a value of N is not limited thereto, and the value of N may alternatively be 3, 5, or the like. The laser measurement module further includes (N−1) light beam diverting elements.

When the value of N is an odd number greater than or equal to 5, if i is a positive integer less than (N+1)/2, an $i^{th}$ laser ranging component 101 in the N laser ranging components 101 sends an output light beam to an $i^{th}$ reflector 102 in the N reflectors 102 through an $i^{th}$ light beam diverting component in the (N−1) light beam diverting components; or if i is a positive integer greater than (N+1)/2, an $i^{th}$ laser ranging component 101 in the N laser ranging components 101 sends an output light beam to an $i^{th}$ reflector 102 in the N reflectors 102 through an $i^{th}$ light beam diverting element in the (N−1) light beam diverting elements, where i is a positive integer less than or equal to N.

Specifically, when the value of N is the odd number, the laser measurement module further includes the (N−1) light beam diverting elements. Because the quantity of laser ranging components in the laser measurement module and the quantity of reflectors in the laser measurement module are both N, a quantity of light beam diverting elements in the laser measurement module is one less than the quantity of laser ranging components in the laser measurement module, An $((N+1)/2)^{th}$ laser ranging component located in a center of the N laser ranging components directly outputs an emergent light beam of the $((N+1)/2)^{th}$ laser ranging component and sends the emergent light beam of the $((N+1)/2)^{th}$ laser ranging component to an $((N+1)/2)^{th}$ reflector without using a light beam diverting element. Laser ranging components other than the $((N+1)/2)^{th}$ laser ranging component in the N laser ranging components respectively send emergent light beams to corresponding reflectors through light beam diverting elements.

In FIG. 14, first (N+1)/2 laser ranging components and first (N−1)/2 reflectors in the laser measurement module may respectively implement optical path connections through (N−1)/2 light beam diverting elements. The $((N+1)/2)^{th}$ laser ranging component and the $((N+1)/2)^{th}$ reflector in the laser measurement module directly implement an optical path connection without the light beam diverting element. $((N+3)/2)^{th}$ laser ranging component and an $((N+3)/2)^{th}$ reflector in the laser measurement module may implement an optical path connection through an $((N+1)/2)^{th}$ light beam diverting element. Similarly, the $N^{th}$ laser ranging component and the $N^{th}$ reflector in the laser measurement module may implement an optical path connection through the $(N-1)^{th}$ light beam diverting element.

In some embodiments of this application, an included angle between the $i^{th}$ reflector and the $i^{th}$ laser ranging component is less than a preset first angle threshold. In this case, the laser measurement module shown in FIG. 14 exists. A value of the first angle threshold may be determined based on a position relationship between the reflector and the laser ranging component on the laser measurement module. For example, the first angle threshold may be any angle value in a range of 20° to 50°.

For example, the laser measurement module includes N reflector groups. When the value of N is the odd number greater than or equal to 5, if i is not equal to (N+1)/2, an $i^{th}$ reflector group includes a reflector and a light beam diverting element; or if i is equal to (N+1)/2, an $i^{th}$ reflector group includes a reflector, but the $i^{th}$ reflector group does not include a light beam diverting element. For example, with reference to FIG. 14, when a value of i is equal to (N+1)/2, the $((N+1)/2)^{th}$ reflector constitutes one reflector group; or when i is not equal to (N+1)/2, one reflector and one light beam diverting element constitute one reflector group.

Figure 15:
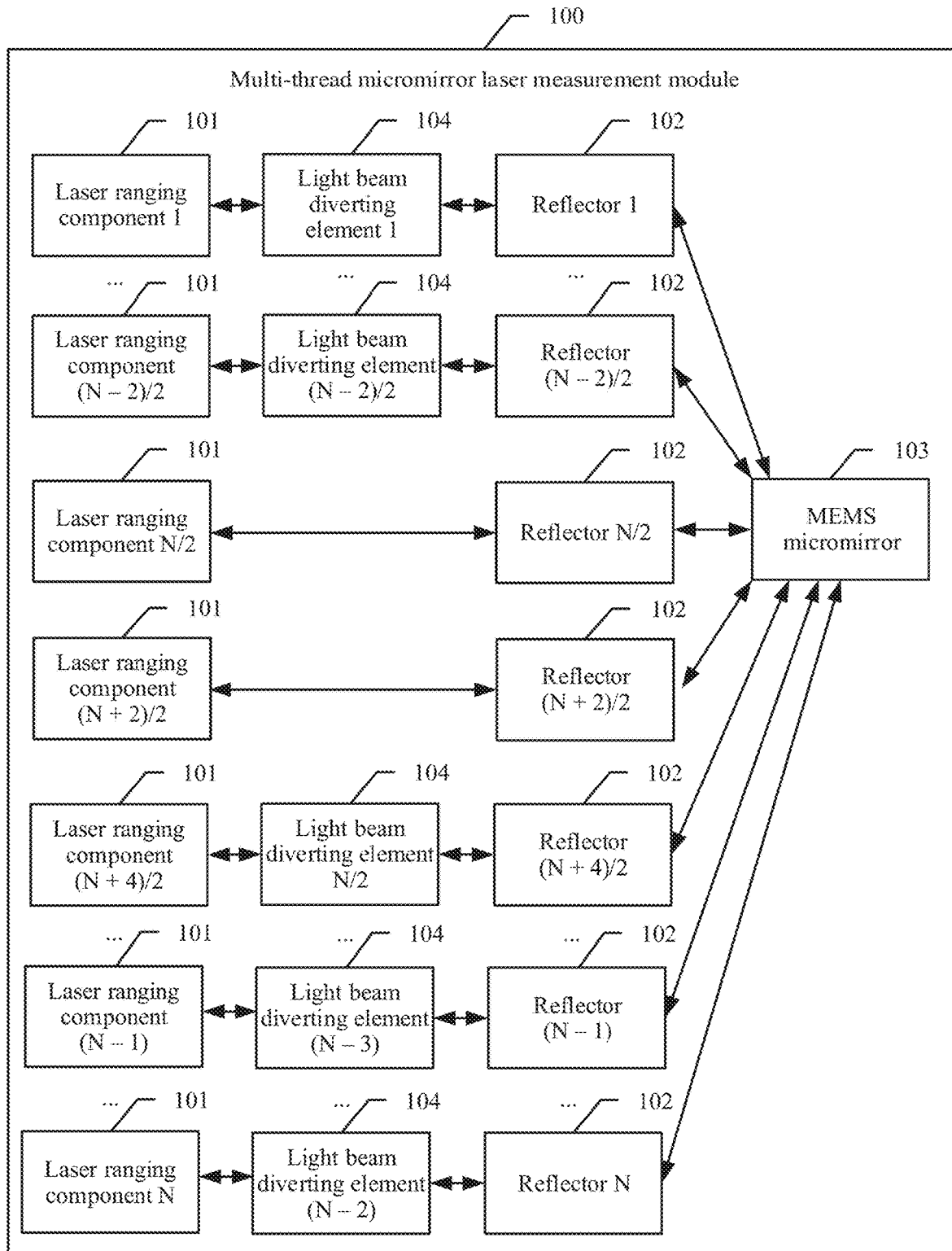
FIG. 15 is another schematic structural diagram of a laser ranging component according to an embodiment of this application.

In some embodiments of this application, referring to FIG. 15, an example in which N is greater than or equal to 8 is used for description in FIG. 15. Without limitation, a value of is not limited thereto, and the value of N may alternatively be 2, 4, 6, or the like. The laser measurement module further includes (N−2) light beam diverting elements.

When the value of N is an even number greater than or equal to 6, if i is less than N/2, an $i^{th}$ laser ranging component 101 in the N laser ranging components 101 sends an output light beam to an $i^{th}$ reflector 102 in the N reflectors 102 through an $i^{th}$ light beam diverting component in the (N−2) light beam diverting components; or if i is greater than (N−2)/2, an $i^{th}$ laser ranging component 101 in the N laser ranging components 101 sends an output light beam to an $i^{th}$ reflector 102 in the N reflectors 102 through an $(i-2)^{th}$ light beam diverting element in the (N−2) light beam diverting elements, where i is a positive integer less than or equal to N.

Specifically, when the value of N is the even number, the laser measurement module further includes the (N−2) light beam diverting elements. Because the quantity of laser ranging components and the quantity of reflectors in the laser measurement module are both N, a quantity of light beam diverting elements in the laser measurement module is two less than the quantity of laser ranging components in the laser measurement module. An $((N+2)/2)^{th}$ laser ranging component and an $(N/2)^{th}$ laser ranging component that are located in a center of the N laser ranging components respectively sends an emergent light beam of the $((N+2)/2)^{th}$ laser ranging component to an $((N+2)/2)^{th}$ reflector and an emergent light beam of the $(N/2)^{th}$ laser ranging component to an $(N/2)^{th}$ reflector without light beam diverting elements. Laser ranging components other than the $((N+2)/2)^{th}$ laser ranging component and the $(N/2)^{th}$ laser ranging component in the N laser ranging components respectively send emergent light beams to corresponding reflectors through light beam diverting elements.

In FIG. 15, first (N−2)/2 laser ranging components and first (N−2)/2 reflectors in the laser measurement module may implement optical path connections through (N−2)/2 light beam diverting elements. The $(N/2)^{th}$ laser ranging component and the $(N/2)^{th}$ reflector in the laser measurement module directly implement an optical path connection without the light beam diverting element. Similarly, the $((N+2)/2)^{th}$ laser ranging component and the $((N+2)/2)^{th}$ reflector in the laser measurement module directly implement an optical path connection without the light beam diverting element. An $((N+4)/2)^{th}$ laser ranging component and an $((N+4)/2)^{th}$ reflector in the laser measurement module may directly implement an optical path connection through an $(N/2)^{th}$ light beam diverting element. Similarly, the $N^{th}$ laser ranging component and the $N^{th}$ reflector in the laser measurement module may directly implement an optical path connection through an $(N-2)^{th}$ light beam diverting element.

In some embodiments of this application, an included angle between the $i^{th}$ reflector and the $i^{th}$ laser ranging component is less than a preset first angle threshold. In this case, the laser measurement module shown in FIG. 15 exists. A value of the first angle threshold may be determined based on a position relationship between the reflector and the laser ranging component on the laser measurement module. For example, the first angle threshold may be any angle value in a range of 20° to 50°.

For example, the laser measurement module includes N reflector groups. When the value of N is the even number greater than or equal to 6, if i is not equal to (N+2)/2 and is not equal to N/2, an $i^{th}$ reflector group includes a reflector and a light beam diverting element; or if i is equal to (N+2)/2 or equal to N/2, an $i^{th}$ reflector group includes a reflector, but the $i^{th}$ reflector group does not include a light beam diverting element. For example, with reference to FIG. 15, when a value of i is equal to (N+2)/2 or equal to N/2, the $((N+2)/2)^{th}$ reflector constitutes one reflector group, and the $(N/2)^{th}$ reflector constitutes one reflector group; or when i is not equal to (N+2)/2 or not equal to N/2, one reflector and one light beam diverting element constitute one reflector group.

In some embodiments of this application, a light beam diverting element 104 is configured to refract an emergent light beam of a laser ranging component 101, and emit the refracted emergent light beam onto a reflector 102.

The light beam diverting element 104 is further configured to emit an echo light beam sent by the reflector 102 onto the laser ranging component 101.

The light beam diverting element 104 may be configured to divert, a light beam received by the light beam diverting element 104. For example, the light beam diverting element 104 has a light beam refraction function, so that a direction of the light beam received by the light beam diverting element 104 can be changed. The light beam diverting element 104 receives the emergent light beam from the laser ranging component 101, and may refract the emergent light beam. The light beam diverting element 104 receives the echo light beam from the reflector 102, then refracts the echo light beam, and finally sends the echo light beam to the laser ranging component 101. The laser ranging component 101 performs ranging.

In this embodiment of this application, the light beam diverting element may be a refracting mirror, the refracting mirror has a light beam refraction function, and the refracting mirror may be disposed between the laser ranging component and the reflector. For example, the refracting mirror includes a prism. In a subsequent embodiment, an example in which the prism is used to implement the optical path refraction function is used for description. Without limitation, the light beam diverting element shown in FIG. 14 and FIG. 15 may alternatively be another device having a light beam refraction function. This is merely an example herein, and is not intended to limit this embodiment of this application.

Figure 16:
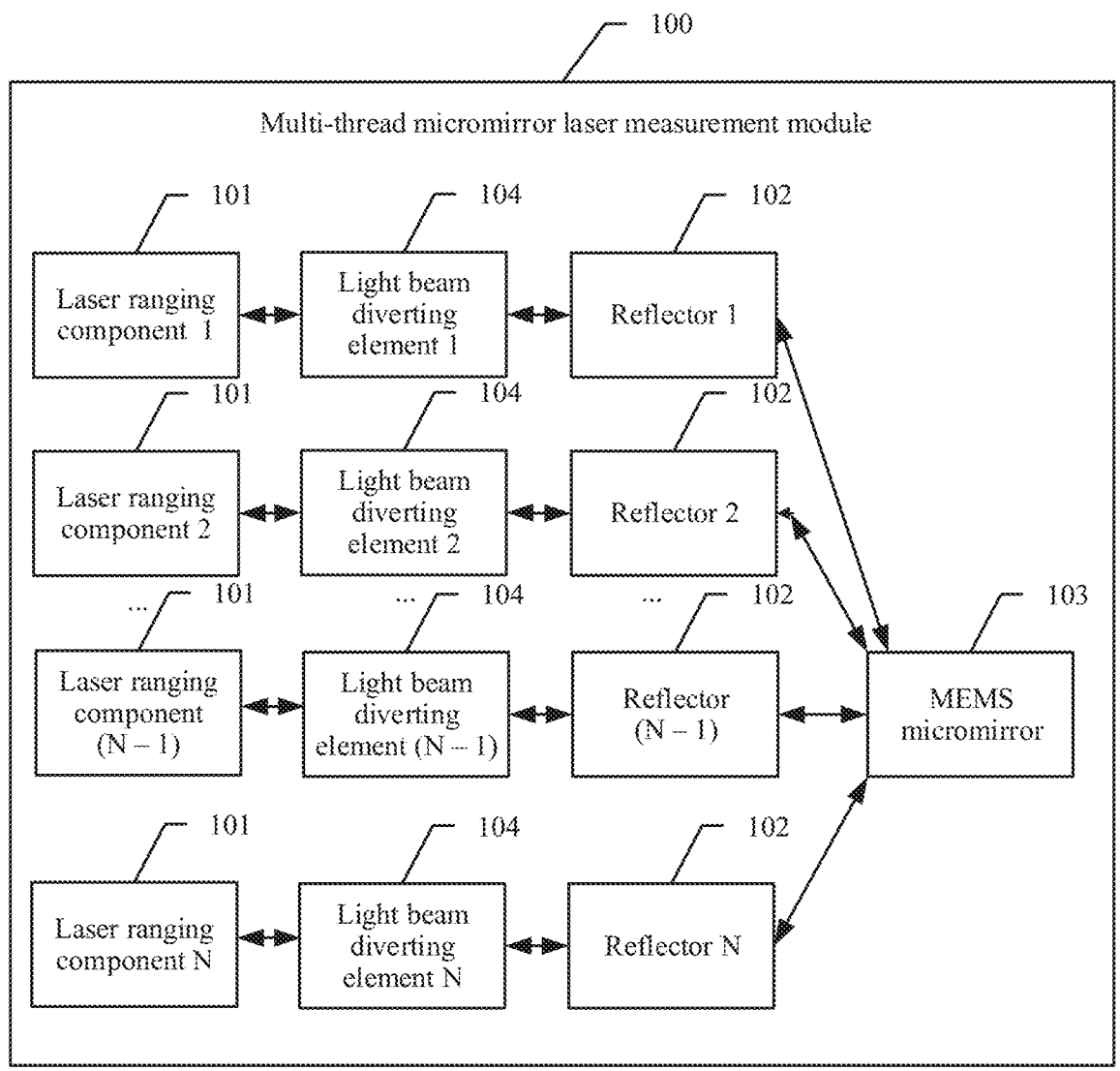
FIG. 16 is another schematic structural diagram of a laser ranging component according to an embodiment of this application.

In some embodiments of this application, referring to FIG. 16, the laser measurement module further includes N light beam diverting elements.

The N light beam diverting elements one-to-one correspond to the N reflectors 102.

Each of the N laser ranging components 101 is configured to emit the emergent light beam onto the corresponding reflector 102 through a corresponding light beam diverting element.

Specifically, the laser measurement module further includes the N light beam diverting elements. Because the quantity of laser ranging components in the laser measurement module and the quantity of reflectors in the laser measurement module are both N, a quantity of light beam diverting elements in the laser measurement module is equal to the quantity of laser ranging components in the laser measurement module, and the quantity of light beam diverting elements in the laser measurement module is also equal to the quantity of reflectors in the laser measurement module. Each of the N laser ranging components sends the emergent light beam of the laser ranging component to the corresponding reflector through one light beam diverting element.

In FIG. 16, each laser ranging component and each reflector in the laser measurement module may implement an optical path connection through one light beam diverting element. For example, a laser ranging component 1 and a reflector 1 implement an optical path connection through a light beam diverting element 1, a laser ranging component 2 and a reflector 2 implement an optical path connection through a light beam diverting element 2, and a laser ranging component N and a reflector N implement an optical path connection through a light beam diverting element N.

In some embodiments of this application, an included angle between the $i^{th}$ reflector and the $i^{th}$ laser ranging component is greater than a preset first angle threshold. In this case, the laser measurement module shown in FIG. 16 exists. A value of the first angle threshold may be determined based on a position relationship between the reflector and the laser ranging component on the laser measurement module. For example, the first angle threshold may be any angle value in a range of 20° to 50°.

For example, the laser measurement module includes N reflector groups. When i is any positive integer less than or equal to N, an $i^{th}$ reflector group includes a reflector and a light beam diverting element. For example, with reference to FIG. 16, when a value of i is equal to (N/2+1), an $(N/2+1)^{th}$ reflector constitutes one reflector group. Herein, the value of i may alternatively be another value less than or equal to N. This is merely an example for description, and is not intended to limit this embodiment of this application.

As shown in FIG. 16, the light beam diverting element is configured to divert a light beam received by the element. For example, the light beam diverting element has a light beam reflection function, so that a direction of the light beam received by the element can be changed. A light beam diverting element 104 receives an emergent light beam from a laser ranging component 101, and may reflect the emergent light beam. The light beam diverting element 104 receives an echo light beam from a reflector 102, then reflects the echo light beam, and finally sends the echo light beam to the laser ranging component 101. The laser ranging component 101 performs ranging.

In some embodiments of this application, the light beam diverting element may be a diverting mirror, the diverting mirror has a light beam reflection function, and the diverting mirror may be disposed between the laser ranging component and the reflector. In a subsequent embodiment, an example in which the diverting mirror is used to implement the light beam reflection function is used for description. Without limitation, the light beam diverting element shown in FIG. 16 may alternatively be another device having a light beam reflection function. This is merely an example herein, and is not intended to limit this embodiment of this application.

In some embodiments of this application, the N reflectors are located on a same straight line. When a value of N is an odd number greater than or equal to 5, if i is an integer greater than 2 and less than or equal to (N+1)/2, a spacing between an $(i-2)^{th}$ reflector and an $(i-1)^{th}$ reflector in the N reflectors is not less than a spacing between the $(i-1)^{th}$ reflector and an $i^{th}$ reflector in the N reflectors; or if i is an integer greater than (N+1)/2 and less than or equal to N, a spacing between an $(i-2)^{th}$ reflector and an $(i-1)^{th}$ reflector in the N reflectors is not greater than a spacing between the $(i-1)^{th}$ reflector and an $i^{th}$ reflector in the N reflectors.

Optionally, the $(N+1)/2^{th}$ reflector is used as a center, and reflectors other than the $((N+1)/2)^{th}$ reflector in the N reflectors are symmetrically distributed.

The N reflectors are located on the same straight line. For example, mirror surface centers of the N reflectors may be located on a same straight line, and the N reflectors are symmetrically distributed. For example, intervals between every two adjacent reflectors in the N reflectors are not equal. When the value of N is the odd number greater than or equal to 5, the $((N+1)/2)^{th}$ reflector is used as the center. For example, if the value of N is 5, a third reflector is used as the center. Reflectors other than the $((N+1)/2)^{th}$ reflector in the N reflectors are symmetrically distributed at unequal intervals.

In the embodiments of this application, the intervals between every two adjacent reflectors in the N reflectors may be equal or not equal. For example, when N is equal to 3, the intervals between every two adjacent reflectors in the N reflectors are equal. For another example, the intervals between every two adjacent reflectors in the N reflectors are not equal. A spacing between two reflectors closer to the center is smaller, and a spacing between two reflectors farther away from the center is larger. For example, if i is an integer greater than 2 and less than or equal to (N+1)/2, the spacing between the $(i-2)^{th}$ reflector and the $(i-1)^{th}$ reflector in the N reflectors is not less than the spacing between the $(i-1)^{th}$ reflector and the $i^{th}$ reflector in the N reflectors. The $(i-2)^{th}$ reflector, the $(i-1)^{th}$ reflector, and the $i^{th}$ reflector are successively close to the center (namely, the $((N+1)/2)^{th}$ reflector), Therefore, the spacing between the $(i-1)^{th}$ reflector and the $i^{th}$ reflector is not greater than the spacing between the $(i-2)^{th}$ reflector and the $(i-1)^{th}$ reflector. Similarly, if i is an integer greater than (N+1)/2 and less than or equal to N, the spacing between an $(i-2)^{th}$ reflector and the $(i-1)^{th}$ reflector in the N reflectors is not greater than the spacing between the $(i-1)^{th}$ reflector and the $i^{th}$ reflector in the N reflectors.

In some embodiments of this application, the N reflectors are located on a same straight line. When a value of N is an even number greater than or equal to 6, if i is an integer greater than 2 and less than or equal to N/2, a spacing between an $(i-2)^{th}$ reflector and an $(i-1)^{th}$ reflector in the N reflectors is not less than a spacing between the $(i-1)^{th}$ reflector and an $i^{th}$ reflector in the N reflectors; or if i is an integer greater than N/2 and less than or equal to N, a spacing between an $(i-2)^{th}$ reflector and an $(i-1)^{th}$ reflector in the N reflectors is not greater than a spacing between the $(i-1)^{th}$ reflector and an $i^{th}$ reflector in the N reflectors.

Optionally, a midpoint between an $(N/2)^{th}$ reflector and an $(N/2+1)^{th}$ reflector is used as a center, and reflectors other than the $(N/2)^{th}$ reflector and the $(N/2+1)^{th}$ reflector in the N reflectors are symmetrically distributed.

The N reflectors are located on the same straight line. For example, mirror surface centers of the N reflectors may be located on a same straight line, and the N reflectors are symmetrically distributed. For example, intervals between every two adjacent reflectors in the N reflectors are not equal. When the value of N is the even number greater than or equal to 6, the midpoint between the $(N/2)^{th}$ reflector and the $(N/2+1)^{th}$ reflector is used as the center, and reflectors other than the $(N/2)^{th}$ reflector and the $(N/2+1)^{th}$ reflector in the N reflectors are symmetrically distributed at unequal intervals.

In some embodiments of this application, the intervals between every two adjacent reflectors in the N reflectors may be equal or not equal. For example, when N is equal to 3, the intervals between every two adjacent reflectors in the N reflectors are equal. For another example, the intervals between every two adjacent reflectors in the N reflectors are not equal. A spacing between two reflectors closer to the center is smaller, and a spacing between two reflectors farther away from the center is larger. For example, if i is an integer greater than 2 and less than or equal to N/2, the spacing between the $(i-2)^{th}$ reflector and the $(i-1)^{th}$ reflector in the N reflectors is not less than the spacing between the $(i-1)^{th}$ reflector and the $i^{th}$ reflector in the N reflectors. The $(i-2)^{th}$ reflector, the $(i-1)^{th}$ reflector, and the $i^{th}$ reflector are successively close to the center (namely, the midpoint between the $(N/2)^{th}$ reflector and the $(N/2+1)^{th}$ reflector). Therefore, the spacing between the $(i-1)^{th}$ reflector and the $i^{th}$ reflector is not greater than the spacing between the $(i-2)^{th}$ reflector and the $(i-1)^{th}$ reflector. Similarly, if i is an integer greater than N/2 and less than or equal to N, the spacing between the $(i-2)^{th}$ reflector and the $(i-1)^{th}$ reflector in the N reflectors is not greater than the spacing between the $(i-1)^{th}$ reflector and the $i^{th}$ reflector in the N reflectors.

For example, the value of N is 5. To ensure that scanning areas of five groups of laser ranging components are spliced continuously and that no mismatching occurs in a scanned image, it is required that live groups of emergent light beams after passing through the MEMS micromirror are distributed at an equal angle in a horizontal direction (an X-axis), and emergent angles in a vertical direction (a Y axis) are same. Five reflectors need to be arranged in a straight line along the X axis. For example, a third reflector is used as a center, first two reflectors and last two reflectors are in a left-right mirror relationship, and the five reflectors are arranged at unequal intervals. A spacing between two adjacent reflectors that are on each of two sides is relatively large. A spacing between two adjacent reflectors that are close to the center is relatively small. Parameters such as intervals and shapes of the five reflectors are changed, so that angles of the light beams emitted onto the MEMS micromirror can be changed to output specific scanning angles.

In some embodiments of this application, an included angle between a mirror surface normal direction of the $i^{th}$ reflector in the N reflectors and an emergent light beam of the $i^{th}$ reflector in the N reflectors is equal to an included angle between a mirror surface normal direction of an $(i+1)^{th}$ reflector in the N reflectors and an emergent light beam of the $(i+1)^{th}$ reflector in the N reflectors, where i is a positive integer less than or equal to N.

In this embodiment of this application, the $i^{th}$ reflector and the $(i+1)^{th}$ reflector in the N reflectors are two adjacent reflectors, and both the emergent light beam of the $i^{th}$ reflector and the emergent light beam of the $+1)^{th}$ reflector are sent to the MEMS micromirror. The included angle between the mirror surface normal direction of the reflector in the N reflectors and the emergent light beam of the $i^{th}$ reflector in the N reflectors is a first included angle, and the included angle between the mirror surface normal direction of the $(i+1)^{th}$ reflector in the N reflectors and the emergent light beam of the $(i+1)^{th}$ reflector in the N reflectors is a second included angle. The first included angle is equal to the second included angle. That is, included angles between mirror surface normal directions of the N reflectors and emergent light beams of the N reflectors are the same, to ensure that the emergent light beams of the N reflectors are emitted onto the MEMS micromirror in a same direction. In this way, it is ensured that the MEMS micromirror can receive N emergent light beams from a same direction.

It should be noted that, that the first included angle is equal to the second included angle herein means that the two included angles are equal when an error is ignored and precision is the same. For example, if the first included angle is 32°, and the second included angle is also 32°, the first included angle is equal to the second included angle. If a specific error exists, it may also be considered that the first included angle is equal to the second included angle. For example, if the error is 0.1°, the first included angle is 32.01°, and the second included angle is 32.03°, it may also be considered that the first included angle is equal to the second included angle.

For example, an example in which the value of N is 5 is used, after being reflected by the five reflectors and the MEMS micromirror, the five emergent light beams are emitted at an equal angle on a same plane 400. An interval between angles is 15°, and the plane 400 is parallel to a bottom surface on which the laser ranging components are located. The MEMS micromirror swings at an angle in two-dimensional space. For example, a swing angle of the MEMS micromirror in one dimension (for example, the horizontal direction) is 20°, and a swing angle of the MEMS micromirror in another dimension (for example, the vertical direction) is 20°. In this case, a swing angle of the MEMS micromirror may be abbreviated as 20*20°. The five groups of laser ranging components and the five reflectors may be used to implement a scanning range of 100*20°, where 100*20° represents that a swing angle in one dimension is 100° and a swing angle in another dimension is 20°.

In some embodiments of this application, the MEMS micromirror is configured to: separately receive the emergent light beams sent by the N reflectors, change the directions of the emergent light beams respectively sent by the N reflectors to implement two-dimensional scanning, and send the emergent light beams respectively corresponding to the N reflectors.

Included angles between emergent light beams, sent by two adjacent reflectors, in the emergent light beams that respectively correspond to the N reflectors and that are sent by the MEMS micromirror are equal.

Specifically, the laser measurement module may include the N reflectors, and the N reflectors may emit N emergent light beams. The MEMS micromirror is configured to: separately receive the emergent light beams sent by the N reflectors, change the directions of the emergent light beams respectively sent by the N reflectors, to implement the two-dimensional scanning, and send the emergent light beams respectively corresponding to the N reflectors. Included angles between emergent light beams, sent by two adjacent reflectors, in the emergent light beams that respectively correspond to the N reflectors and that are sent by the MEMS micromirror are equal. That is, included angles between the N emergent light beams sent by the MEMS micromirror are equal. For details, refer to description of a three-dimensional diagram in a subsequent embodiment.

In some embodiments of this application, the N laser ranging components are parallel to each other. In other words, the N laser ranging components in the laser measurement module are parallel to each other, so that the plurality of laser ranging components are conveniently disposed in the laser measurement module, provided that the plurality of laser ranging components are in parallel to each other. Therefore, internal components of the laser measurement module provided in the embodiments of this application are more compact, and miniaturization of the laser measurement module is implemented. For details, refer to an example in which a parallel relationship between the plurality of laser ranging components in the three-dimensional diagram in the subsequent embodiment.

The following describes in detail the laser measurement module provided in the embodiments of this application by using a detailed application scenario.

An embodiment of this application relates to an MEMS micromirror laser measurement module, and the MEMS micromirror laser measurement module has high scalability. A plurality of laser ranging components may be used to share a same MEMS micromirror, and each laser ranging component corresponds to one reflector group. The reflector group is used to implement an optical path connection between the laser ranging components and the MEMS micromirror. Each laser ranging component corresponds to one completely independent reflector group. In this way, a location of the laser ranging component may always be fixed, and a scanning angle, a light emission direction, an appearance, and the like of a laser radar may be changed only by adjusting a design of the reflector group. A flexible optical path architecture greatly improves application scalability of the MEMS laser radar. In addition, the location of the laser ranging component is fixed, and only a passive reflector group is adjusted to perform optical path calibration, to improve stability and convenience of optical path commissioning.

Figure 17:
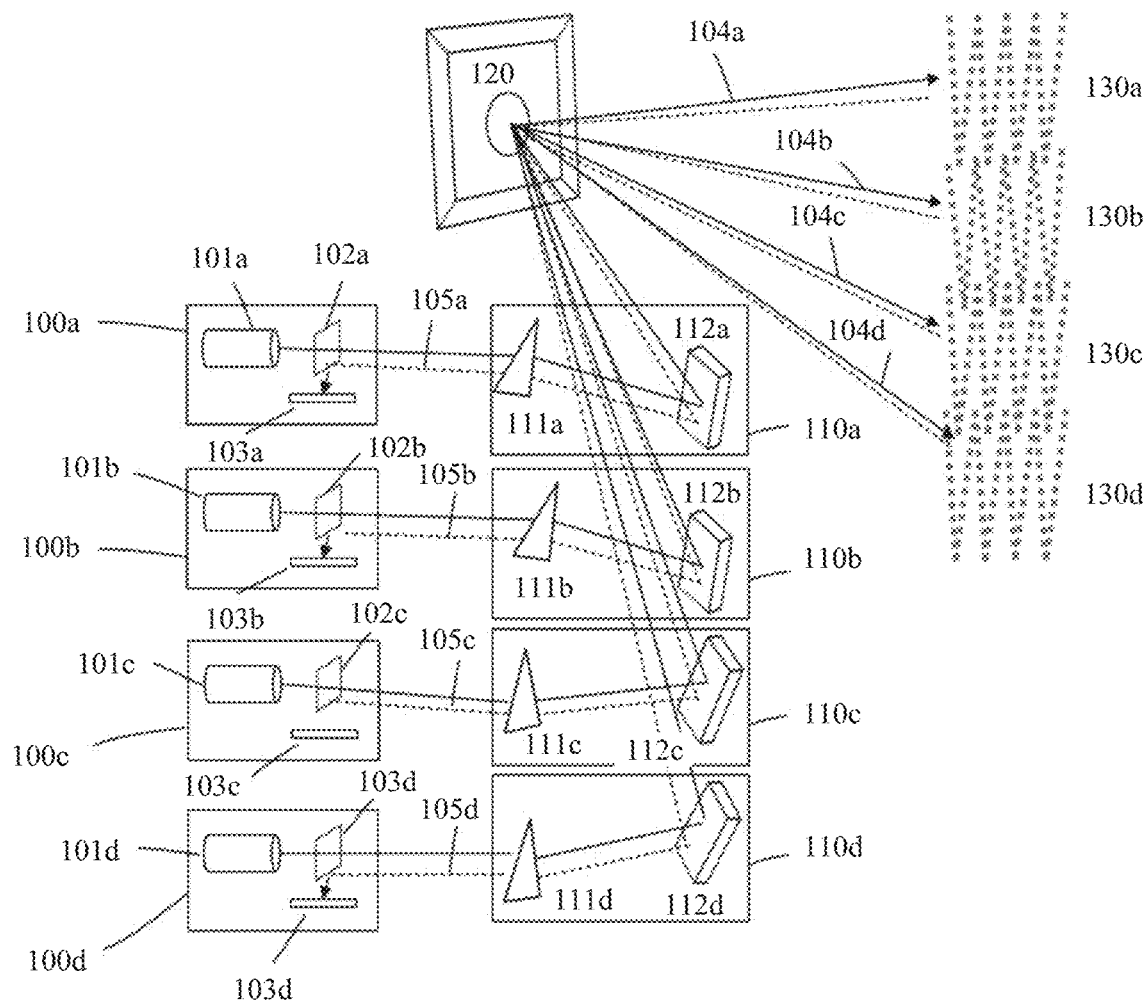
FIG. 17 is another schematic structural diagram of a laser ranging component according to an embodiment of this application.

For example, an MEMS micromirror laser measurement module shown in FIG. 17 includes N groups of laser ranging components, where N=4, namely, laser ranging components 100a, 100b, 100c, and 100d, four reflector groups 110a, 110b, 110c, and 110d, and one MEMS micromirror 120. Configurations of the four groups of laser ranging components are completely the same. 100a is used as an example. 100a mainly includes a laser 101a, a spectroscope 102a, a detector 103a, another necessary optical element (a conventional element, for example, a collimation lens or a focusing lens is not shown), and a drive circuit. The reflector group mainly includes optical elements such as a light beam diverting element (for example, the light beam diverting element may be a diverting mirror and a refracting mirror) and a reflector. If the light beam diverting element is the refracting mirror, the reflector group may also be referred to as a refracting mirror group. The reflector group 110a is used as an example, and an example in which the refracting mirror is a prism is used. The reflector group includes a prism 111a and a reflector 112a. Parameters or spatial locations of prisms and reflectors in the four reflector groups 110a, 110b, 110c, and 110d are different.

An emergent light beam 104a in the laser ranging component 100a is emitted onto the reflector group 110a, the emergent light beam 104a is first refracted by the prism 111a, and then the refracted emergent light beam 104a is emitted onto the reflector 112a. The emergent light beam 104a passing through the reflector 112a is emitted onto the MEMS micromirror 120, and the MEMS micromirror 120 implements light beam scanning 130a through two-dimensional swinging. The emergent light beam 104a whose direction is changed by the MEMS micromirror 120 hits a target object. An echo light beam 105a of the emergent light beam 104a returns along an original path, and is finally received by the detector 103a after passing through optical elements such as the MEMS micromirror 120, the reflector 112a, the prism 111a, and the spectroscope 102a again.

The four groups of laser ranging components 100a, 100b, 100c, and 100d one-to-one correspond to the four reflector groups 110a, 110b, 110c, and 110d. Emergent light beams 104a, 104b, 104c, and 104d of the four groups of laser ranging components are emitted onto the MEMS micromirror 120 after directions are adjusted by respectively passing through the reflector groups 110a, 110b, 110c, and 110d, so that four groups of light beam scanning 130a, 130b, 130c, and 130d are angle-spliced in a horizontal direction. To implement accurate angle splicing, the refracting mirror group needs to be designed based on a location and a light emission direction of a corresponding laser ranging component.

Figure 18:
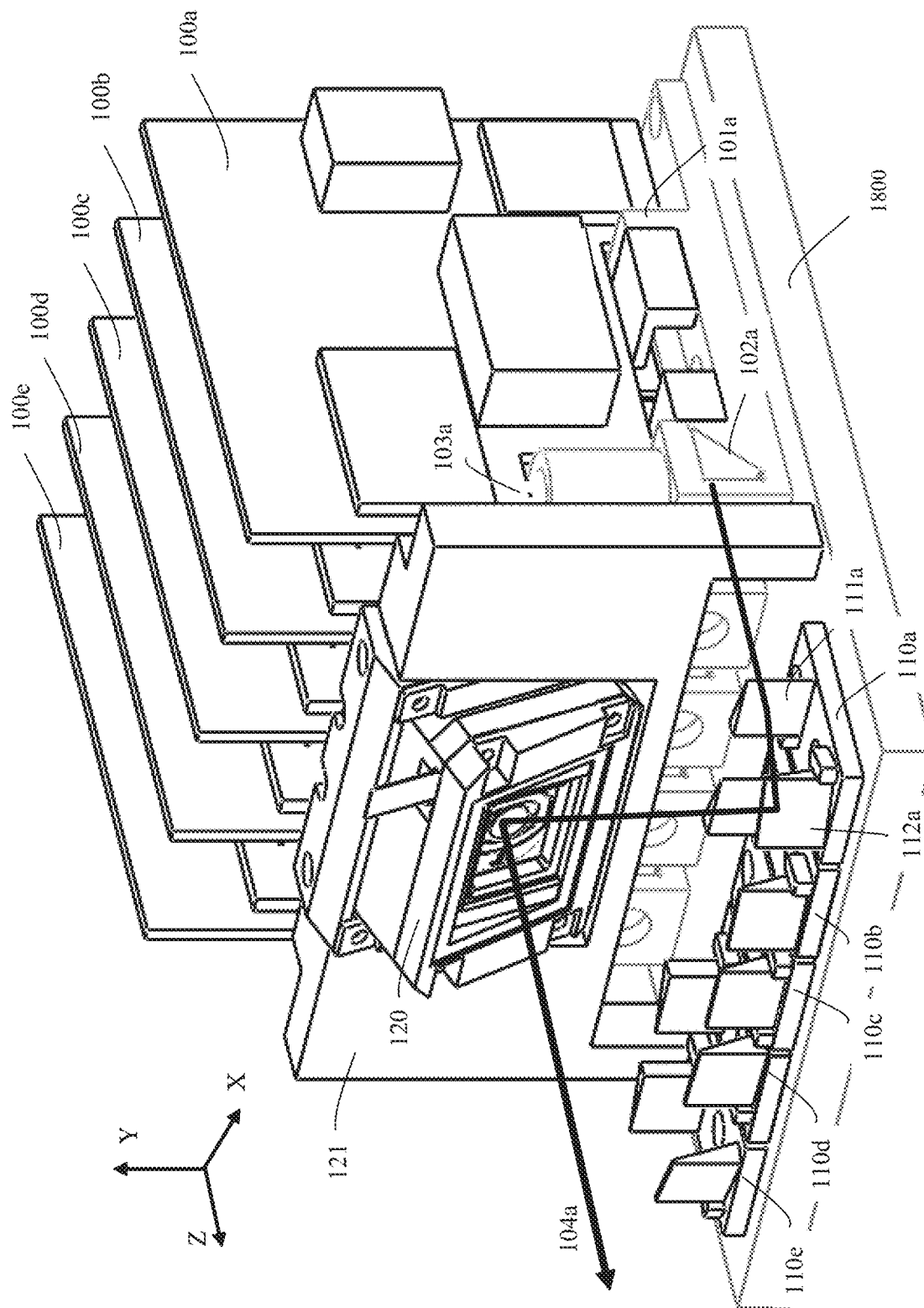
FIG. 18 is a three-dimensional diagram of a laser ranging component according to an embodiment of this application.

FIG. 18 shows a specific embodiment 1 of this application. Five groups of laser ranging components 100a, 100b, 100c, 100d, and 100e, reflector groups 110a, 110b, 110c, 110d, and 110e, one MEMS micromirror 120, and a support 121 are placed on a baseplate 1800. The five laser ranging components one-to-one correspond to the five reflector groups. Directions of emergent light beams of the laser ranging components are defined as a Z direction, an upward direction perpendicular to the baseplate 1800 is defined as a Y direction, and an X direction meets a right-hand rule.

The laser ranging component 100a is used as an example, an emergent light beam 104a of the laser ranging component 100a passes through the reflector group 110a, and then emitted onto the MEMS micromirror 120. Paths of emergent light beams of the remaining laser ranging components 100b, 100c, 100d, and 100e are similar to that of the laser ranging component 100a, and the emergent light beams of the laser ranging components 100b, 100c, 100d, and 100e are all emitted onto the MEMS micromirror 120 by passing through the respective corresponding reflector groups 110b, 110c, 110d, and 110e. A function of the reflector groups 110a, 110b, 110c, 110d, and 110e is to change directions of the emergent light beams of the laser ranging components 100a, 100b, 100c, 100d, and 100e, to enable the emergent light beams to hit the MEMS micromirror 120 according to specified paths, and when the MEMS micromirror 120 performs two-dimensional swinging, scanning angle splicing of a plurality of laser ranging modules is implemented. When a swing angle of the MEMS micromirror 120 is 20*20°, scanning angle splicing is performed by using the five groups of laser ranging components and the five reflector groups, to implement a scanning angle range of 100*20°.

Figure 19:
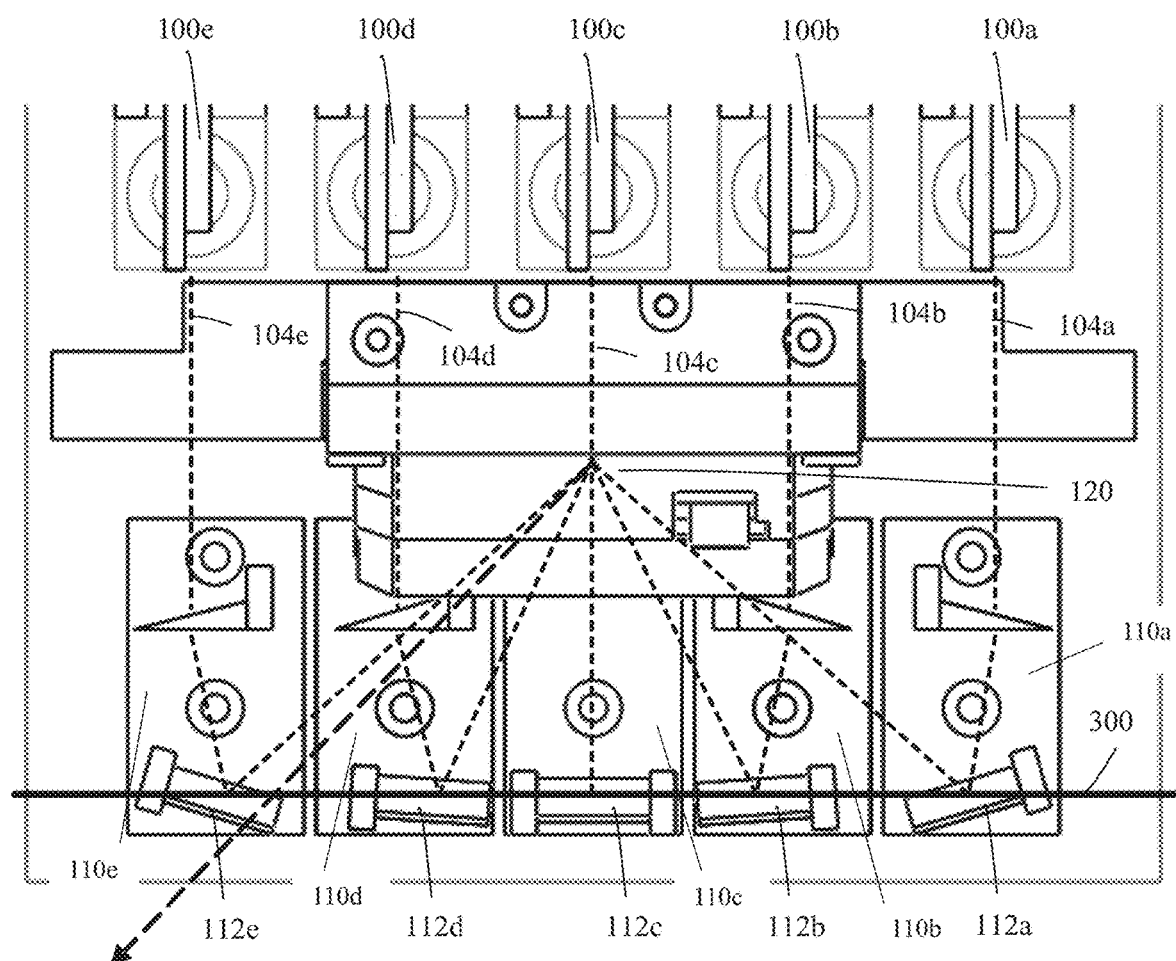
FIG. 19 is a top view of a laser ranging component according to an embodiment of this application.

FIG. 19 is a top view of the specific embodiment 1 of this application. The laser ranging components 100a, 100b, 100c, 100d, and 100e are parallel along an X axis and arranged at an equal interval, so that a space size occupied by the components is minimized. The emergent light beams of the five groups of laser ranging components respectively pass through the reflector groups 110a, 110b, 110c, 110d, and 110e, and then are emitted onto the MEMS micromirror 120. The emergent light beam 104a of the laser ranging component 100a is used as an example. The emergent light beam 104a is refracted on a prism 111a, and a function of the prism 111a is to make the emergent light beam 104a close to a center, to achieve an effect of shortening a length of an optical path. The emergent light beam 104a passing through the prism 111a hits a reflector 112a. A function of the reflector 112a is to change a direction of the emergent light beam 104a, so that the emergent light beam 104a is emitted onto the MEMS micromirror 120. A functional feature of the reflector groups 110b, 110d, and 110e is the same as that of the reflector group 110a, but the intermediate reflector group 110c is different from the reflector groups 110b, 110d, 110e, and 100a. To be specific, the reflector group 110c does not have a prism, and only has a single reflector 112c. If the reflector group 110c is used as a center, the reflector groups 110a and 110b and the reflector groups 110d and 110e are in a left-right mirror relationship.

In the embodiment 1, reflectors 112a, 112b, 112c, 112d, and 112e are necessary optical elements in the five reflector groups 100a, 100b, 100c, 100d, and 100e, and are configured to respectively reflect emergent light beams 104a, 104b, 104c, 104d, and 104e of the laser ranging components 100a, 100b, 100c, 100d, and 100e onto the MEMS micromirror 120, to fold the optical path and greatly shorten the length of the optical path. As shown in FIG. 19, 300 represents a straight line on which the five reflectors are located.

To ensure that scanning areas of the five groups of laser ranging components are spliced continuously and that no mismatching occurs in a scanned image, it is required that the five groups of emergent light beams 104a, 104b, 104c, 104d, and 104e passing through the MEMS micromirror 120 are distributed at an equal angle in a horizontal direction (the X axis), and emergent angles in a vertical direction (a Y axis) are the same. Under this constraint condition, the five reflectors 112a, 112b, 112c, 112d, and 112e need to be arranged on a straight line along the X axis. The reflector 112c is used as the center, the reflectors 112a and 112b and the reflectors 112d and 112e are in the left-right mirror relationship, and the reflector 112a, the reflector 112b, the reflector 112c, the reflector 112d, and the reflector 112e are arranged at unequal intervals. A spacing between the reflector 112a and the reflector 112b that are on one of two sides is relatively large. A spacing between the reflector 112b and the reflector 112c that are close to the center is relatively small. Parameters such as intervals and shapes of the reflectors 112a, 112b, 112c, 112d, and 112e are changed, so that angles of the light beams emitted onto the MEMS micromirror 120 can be changed to output specific scanning angles.

Figure 20:
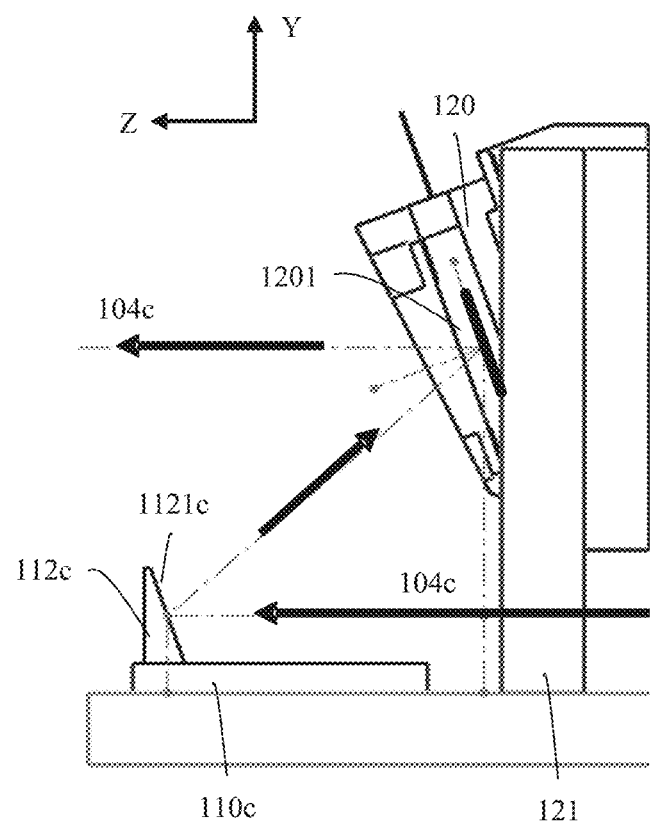
FIG. 20 is a side view of a laser ranging component according to an embodiment of this application.

FIG. 20 is a side view of the specific embodiment 1 of this application. The laser ranging component 100c located in the center is used as an example, an emergent light beam 104c of the laser ranging component 100c is emitted onto the reflector 112c, and 1121c is a reflective surface of the reflector 112c. The emergent light beam 104c passing through the reflective surface 1121c points to the MEMS micromirror 120, and 1201 represents a mirror surface of the MEMS micromirror 120. To ensure that an optical path is not blocked, there is a height difference between the MEMS micromirror 120 and the laser ranging component 110c and the reflector 112c. Therefore, the MEMS micromirror 120 needs to be placed on the support 121. On a YZ plane in FIG. 20, the reflective surface 1121c of the reflector 112c is parallel to the mirror surface 1201 of the MEMS micromirror 120, so that after the emergent light beam 104c of the laser ranging component 100c is reflected twice, a light beam direction does not change.

Figure 21:
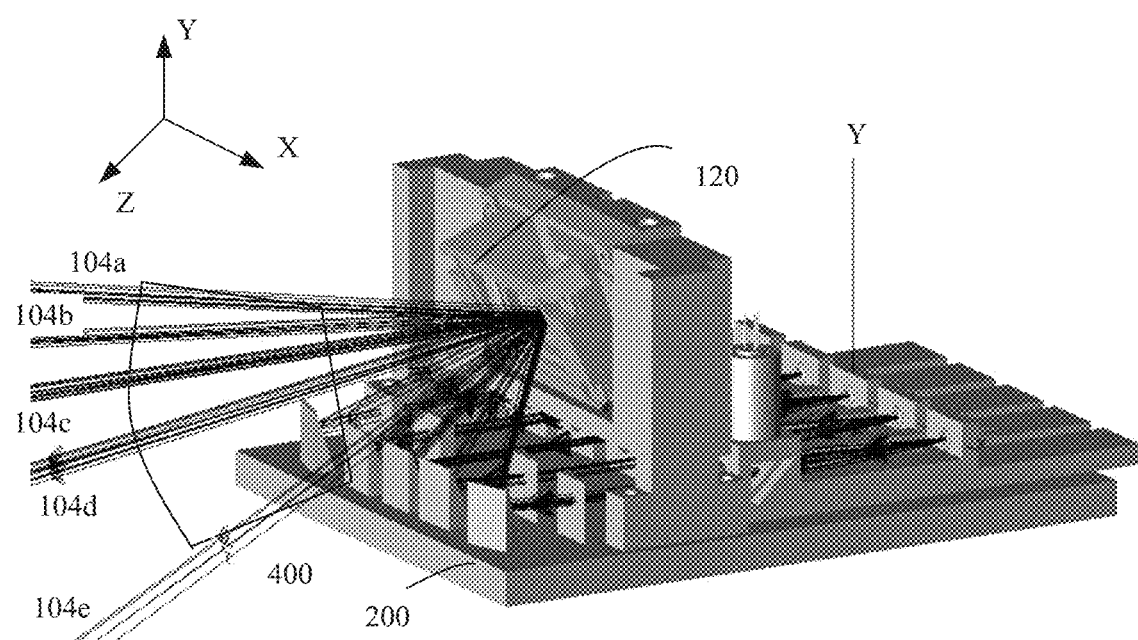
FIG. 21 is another three-dimensional diagram of a laser ranging component according to an embodiment of this application.

FIG. 21 is an optical path diagram of the specific embodiment 1 of this application. Directions of initial emergent light beams 104a, 104b, 104c, 104d, and 104e of the laser ranging components 100a, 100b, 100c, 100d, and 100e point to a Z-axis, and are parallel to the baseplate 1800, where the baseplate 1800 is on an XZ plane. After being reflected by the reflector groups and the MEMS micromirror, emergent light beams 104a, 104b, 104c, 104d, and 104e are emitted at an equal angle on the plane 400, where an angle interval between two adjacent emergent light beams is 15°, and the plane 400 is parallel to the baseplate 1800. In the specific embodiment 1, when the swing angle of the MEMS micromirror is 20*20°, a scanning range of 100*20° may be implemented by using the five groups of laser ranging components and the five reflector groups.

Figure 22:
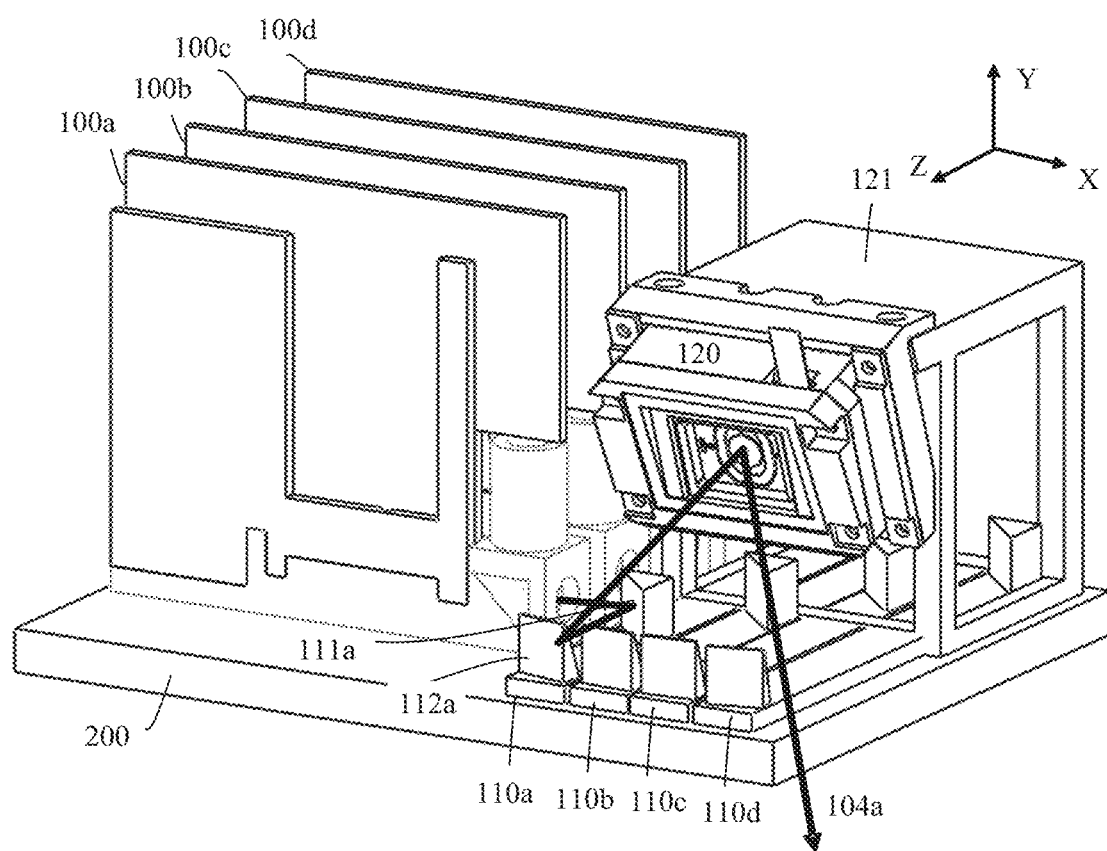
FIG. 22 is another schematic structural diagram of a laser ranging component according to an embodiment of this application.

FIG. 22 shows a specific embodiment 2 of this application. Four groups of laser ranging components 100a, 100b, 100c, and 100d, reflector groups 110a, 110b, 110c, and 110d, one MEMS micromirror 120, and a support 121 are disposed on a baseplate 1800. The MEMS micromirror 120 is disposed on the support 121, and each laser ranging component corresponds to one reflector group. Directions of emergent light beams of the laser ranging components are defined as an X direction, an upward direction perpendicular to the baseplate 1800 is defined as a. Y direction, and a Z direction meets a right-hand rule.

The laser ranging component 100a is used as an example, an emergent light beam 104a of the laser ranging component 100a passes through the reflector group 110a, and then emitted onto the MEMS micromirror 120. Paths of emergent light beams of the remaining laser ranging components 100b, 100c, and 100d are similar to that of the laser ranging component 100a, and the emergent light beams of the laser ranging components 100b, 100c, and 100d are all emitted onto the MEMS micromirror 120 by passing through the respective corresponding reflector groups 110b, 110c, and 110d. A function of the reflector groups 110a, 110b, 110c, and 110d is to change directions of the emergent light beams of the laser ranging components, to enable the emergent light beams to hit the MEMS micromirror 120 according to specified paths, and when the MEMS micromirror 120 performs two-dimensional swinging, scanning angle splicing of a plurality of laser ranging modules is implemented. The MEMS micromirror swings at an angle in two-dimensional space. For example, a swing angle of the MEMS micromirror in one dimension (for example, a horizontal direction) is 15°, and a swing angle of the MEMS micromirror in another dimension (for example, a vertical direction) is 30°. In this case, a swing angle of the MEMS micromirror may be abbreviated as 1.5*30°. Scanning angle splicing is performed by using the four groups of laser ranging components and the four reflector groups, to implement a scanning angle range of 60*30°, where 60*30° represents that a swing angle in one dimension is 60° and a swing angle in another dimension is 30°.

Figure 23:
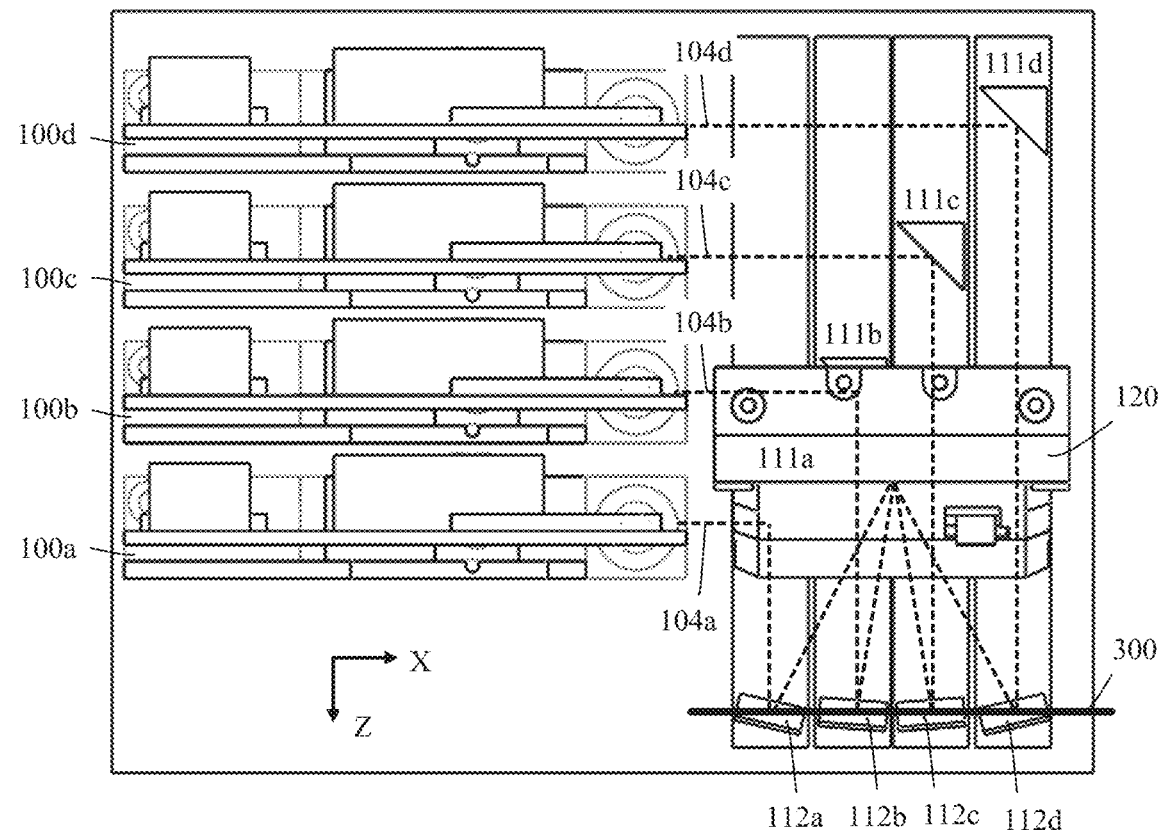
FIG. 23 is another top view of a laser ranging component according to an embodiment of this application.

FIG. 23 is a top view of the specific embodiment 2 of this application. The laser ranging components 100a, 100b, 100c, and 100d are parallel along an X axis and arranged at an equal interval, so that a space size occupied by the components is minimized. Emergent light beams 104a, 104b, 104c, and 104d of the four groups of laser ranging components respectively pass through the reflector groups 110a, 110b, 110c, and 110d, and then are emitted onto the MEMS micromirror 120. The emergent light beam 104c of the laser ranging component 100c is used as an example. The emergent light beam 104c is diverted on a diverting mirror 111c, to change a light emission direction of the laser measurement module. The emergent light beam 104c passing through the diverting mirror 111c hits a reflector 112c, and the reflector 112c guides the emergent light beam 104c to the MEMS micromirror 120, to implement angle splicing.

Compared with the foregoing embodiment 1, in the embodiment 2, reflectors 112a, 112b, 112c, and 112d respectively reflect the emergent light beams 104a, 104b, 104c, and 104d of the laser ranging components 100a, 100b, 100c, and 100d onto the MEMS micromirror 120, to fold an optical path, and greatly shorten a length of the optical path, as shown in FIG. 23. Similarly, to ensure that scanning areas of the four groups of laser ranging components are spliced continuously and that no mismatching occurs in a scanned image, it is required that the four groups of emergent light beams 104a, 104b, 104c, and 104d passing through the MEMS micromirror 120 are distributed at an equal angle in the horizontal direction (the X axis), and emergent angles in the vertical direction (a Y axis) are the same. Under this constraint condition, the four reflectors 112a, 112b, 112c, and 112d need to be arranged on a straight line along the X axis.

The MEMS micromirror 120 is used as a center, the reflectors 112a-112b and the reflectors 112c-112d are in a left-right mirror relationship, and the reflectors 112a, 112b, 112c and 112d are arranged at unequal intervals. A spacing between the reflector 112a and the reflector 112b that are on one of two sides is relatively large. A spacing between the reflector 112b and the reflector 112c that are close to the center is relatively small. Parameters such as intervals and shapes of the reflectors 112a, 112b, 112c, 112d, and 112e are changed, so that angles of the light beams emitted onto the MEMS micromirror 120 can be changed to output specific scanning angles.

Figure 24:
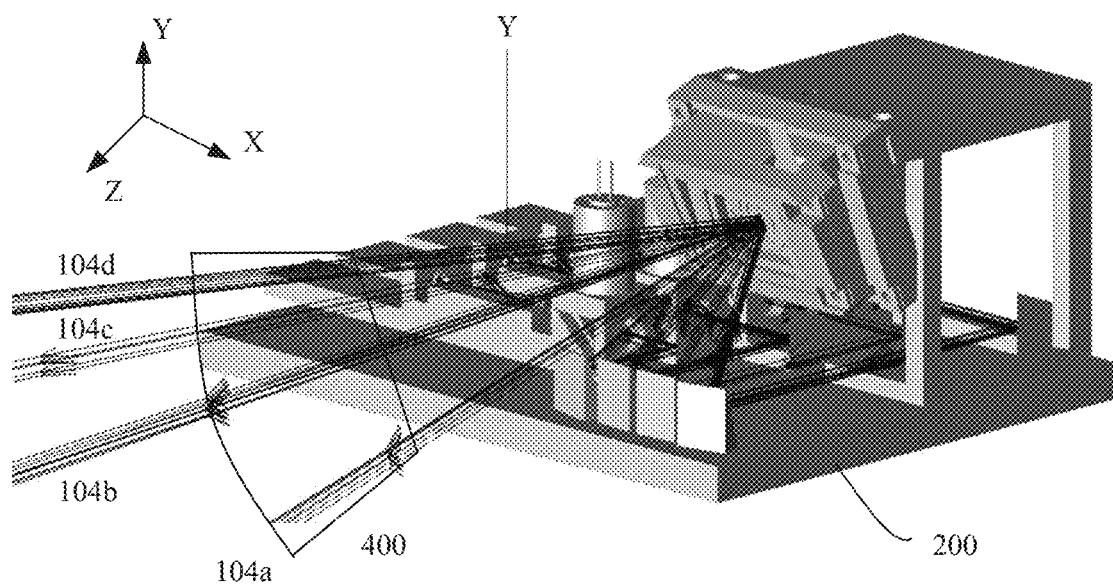
FIG. 24 is another three-dimensional diagram of a laser ranging component according to an embodiment of this application.

FIG. 24 is an optical path diagram of the specific embodiment 2 of this application. Directions of initial emergent light beams 104a, 104b, 104c, and 104d of the laser ranging components 100a, 100b, 100c, and 100d point to a Z-axis, and are parallel to the baseplate 1800, where the baseplate 1800 is on an XZ plane. After being reflected by the reflector groups and the MEMS micromirror 120, emergent light beams 104a, 104b, 104c, and 104d are emitted at an equal angle on a plane 400, where an angle interval between two adjacent emergent light beams is 15°, and the plane 400 is parallel to a baseplate 1800. When the swing angle of the MEMS micromirror is 15*30°, a scanning range of 60*30° may be implemented by using the four groups of laser ranging components and the four reflector groups.

Figure 25:
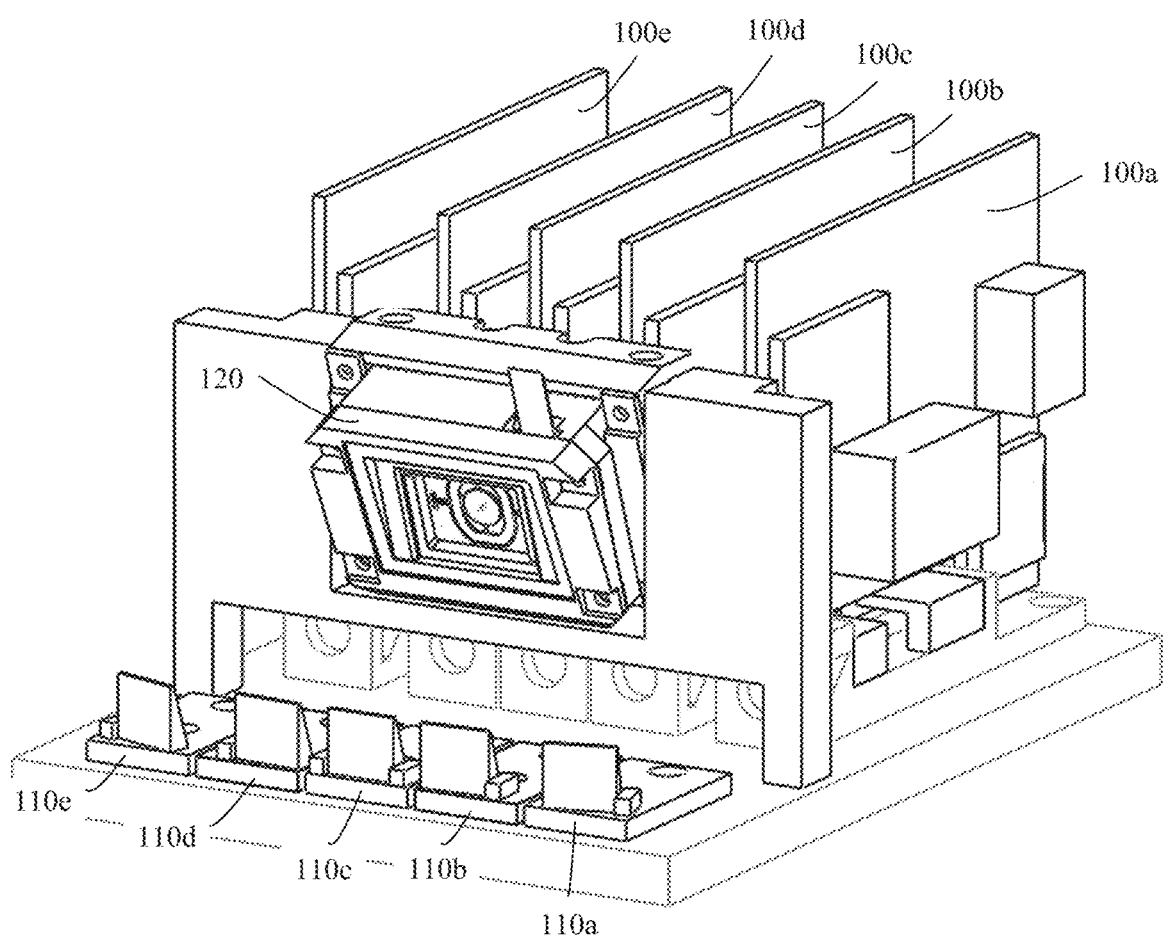
FIG. 25 is another schematic structural diagram of a laser ranging component according to an embodiment of this application.

FIG. 25 shows a specific embodiment 3 of this application. Five groups of laser ranging components 100a, 100b, 100c, 100d, and 100e, reflector groups 110a, 110b, 110c, 110d, and 110e, and one MEMS micromirror 120 are shown in FIG. 25. Different from the embodiment 1, there is no prism and only a single reflector in the reflection group. However, because the reflectors are arranged at unequal intervals, the corresponding five groups of laser ranging components are also arranged at unequal intervals. A spacing between the laser ranging component 100b and the laser ranging component 100c and a spacing between the laser ranging component 100c and the laser ranging component 100d are relatively small. The laser ranging component 100b, the laser ranging component 100c, and laser ranging component 100d are close to the center (MEMS micromirror 120). A spacing between the laser ranging component 100a and the laser ranging component 100b and a spacing between the laser ranging components 100d and 100e are relatively large. The laser ranging component 100a and the laser ranging component 100e are on two sides of the center.

In the embodiments of this application, the N reflector groups are disposed between the N groups of laser ranging components and the single MEMS micromirror. The reflector group includes one or more optical elements such as the prism and the reflector. The N reflector groups one-to-one correspond to the N groups of laser ranging components. The reflector group may guide the emergent light beam of the laser ranging component to the MEMS micromirror, to implement accurate scanning angle splicing and increase a scanning angle of the laser radar.

In the embodiments of this application, the N reflector groups are added between the N laser ranging components and the single MEMS micromirror. The reflector group includes at least one reflector, so that an optical path reflects at least once, to avoid the optical path from being redundant, and further reduce a size of the laser radar. Each laser ranging component corresponds to one independent reflector group. In development of the laser radar, a location of the laser ranging component may be fixed, and a scanning angle, a light emission direction, and the like of the laser radar is changed only by adjusting a parameter design of the reflector group. A flexible optical path architecture enriches a product appearance and an installation mode of the MEMS laser radar without changing a component and a circuit board. This improves application scalability. In addition, in the embodiments of this application, the location of the laser ranging component is fixed, and only a passive reflector group is used to implement optical path calibration, to improve stability and convenience of optical path commissioning.

In addition, it should be noted that the described apparatus embodiment is merely an example. The units described as separate parts may or may not be physically separate, and parts displayed as units may or may not be physical units, may be located in one location, or may be distributed on a plurality of units. Some or all the modules may be selected based on actual needs to achieve the objectives of the solutions of the embodiments.

In the foregoing embodiments, the laser measurement module and laser radar may be implemented by using all or some of hardware, firmware, or any combination thereof.

What is claimed is:

1. A laser measurement system, comprising N laser ranging components, a reflector, and a micro-electro-mechanical system (MEMS) micromirror, wherein:
    N is a positive integer greater than or equal to 2;
    each of the N laser ranging components is configured to emit an emergent light beam onto the reflector;
    the reflector is configured to perform optical path reflecting on the emergent light beam, and emit the reflected emergent light beam onto the MEMS micromirror;
    the MEMS micromirror is configured to (1) change a direction of the emergent light beam to implement two-dimensional scanning, (2) change a direction of an echo light beam, and (3) emit the echo light beam onto the reflector, wherein the echo light beam is a light beam reflected by the emergent light beam emitted onto a target object;
    the reflector is further configured to perform optical path reflecting on the echo light beam, and emit the reflected echo light beam onto each of the N laser ranging components; and
    each of the N laser ranging components is further configured to receive the echo light beam, and perform ranging based on a time difference between the emergent light beam and the echo light beam,
    wherein an included angle $\theta$ between emergent light beams of two adjacent laser ranging components in the N laser ranging components on a horizontal plane has a following relationship with a horizontal swing angle $\chi$ of the MEMS micromirror:

$\theta \leq 2\chi$.

2. The laser measurement system according to claim 1, wherein the N laser ranging components and the MEMS micromirror are located on a same side of the reflector; and
    the N laser ranging components are symmetrically distributed on left and right sides of the MEMS micromirror by using the MEMS micromirror as a center.

3. The laser measurement system according to claim 1, wherein a quantity N of the N laser ranging components has a following relationship with a horizontal scanning angle $\varphi$ of the laser measurement system, the horizontal swing angle $\chi$ of the MEMS micromirror, and the included angle $\theta$ between the emergent light beams of the two adjacent laser ranging components on the horizontal plane:

$$N \geq \frac{\varphi - 2\chi}{\theta}.$$

4. The laser measurement system according to claim 1, wherein a plane on which the N laser ranging components are located and a plane on which the MEMS micromirror is located are different planes.

5. The laser measurement system according to claim 4, wherein an included angle α between an incident light beam and the emergent light beam that are on the reflector on a vertical plane has a following relationship with a vertical inclination angle β of the MEMS micromirror and a vertical swing angle ω of the MEMS micromirror:

α≥ε(2β+ω), wherein

ε is an installation error factor of the reflector and the MEMS micromirror.

6. The laser measurement system according to claim 5, wherein included angles α between incident light beams and emergent light beams that are of the N laser ranging components and that are on the reflector on the vertical plane are equal; and
α is greater than or equal to 10° and less than or equal to 50°.

7. The laser measurement system according to claim 5, wherein the vertical inclination angle β of the MEMS micromirror is greater than or equal to 5° and less than or equal to 45°.

8. The laser measurement system according to claim 1, wherein a quantity of reflectors is M, and M is a positive integer; and
when N is equal to M, the N laser ranging components one-to-one corresponds to the reflectors.

9. The laser measurement system according to claim 1, wherein a quantity of reflectors is M, and M is a positive integer; and
when N is greater than M, at least two of the N laser ranging components correspond to a same reflector.

10. The laser measurement system according to claim 1, wherein each of the N laser ranging components comprises a laser, a spectroscope, and a detector, and wherein:
the laser is configured to generate the emergent light beam, wherein the emergent light beam is emitted onto the reflector through the spectroscope;
the spectroscope is configured to receive the echo light beam emitted by the reflector, and emit the echo light beam onto the detector; and
the detector is configured to receive the echo light beam, and perform ranging based on the time difference between the emergent light beam and the echo light beam.

11. The laser measurement system according to claim 1, wherein the laser measurement system comprises N reflectors and wherein:
the N laser ranging components one-to-one correspond to the N reflectors;
an emergent light beam of each of the N laser ranging components is emitted onto a corresponding reflector in the N reflectors; and
each of the N reflectors is configured to perform optical path reflecting on an emergent light beam of a corresponding laser ranging component, emit the reflected emergent light beam onto the MEMS micromirror, perform optical path reflecting on the echo light beam sent by the MEMS micromirror, and emit the reflected echo light beam onto the corresponding laser ranging component.

12. The laser measurement system according to claim 11, wherein the laser measurement system further comprises N light beam diverting elements;
the N light beam diverting elements one-to-one correspond to the N reflectors; and
each of the N laser ranging components is configured to emit the emergent light beam onto the corresponding reflector through a corresponding light beam diverting element.

13. The laser measurement system according to claim 11, further comprising a light beam diverting that is configured to refract the emergent light beam of the laser ranging component, emit the refracted emergent light beam onto the corresponding reflector, and emit the echo light beam reflected by the reflector onto the corresponding laser ranging component.

14. The laser measurement system according to claim 11, wherein:
the N reflectors are located on a same straight line, and when N is an odd number greater than or equal to 5, an $((N+1)/2)^{th}$ reflector is used as a center; and
if i is an integer greater than 2 and less than or equal to (N+1)/2, a spacing between an $(i-2)^{th}$ reflector and an $(i-1)^{th}$ reflector in the N reflectors is not less than a spacing between the $(i-1)^{th}$ reflector and an $i^{th}$ reflector in the N reflectors; or
if i is an integer greater than (N+1)/2 and less than or equal to N, a spacing between an $(i-2)^{th}$ reflector and an $(i-1)^{th}$ reflector in the N reflectors is not greater than a spacing between the $(i-1)^{th}$ reflector and an $i^{th}$ reflector in the N reflectors.

15. The laser measurement system according to claim 11, wherein:
the N reflectors are located on a same straight line, and when N is an even number greater than or equal to 6, a midpoint between an $(N/2)^{th}$ reflector and an $(N/2+1)^{th}$ reflector is used as a center; and
if i is an integer greater than 2 and less than or equal to N/2, a spacing between an $(i-2)^{th}$ reflector and an $(i-1)^{th}$ reflector in the N reflectors is greater than a spacing between the $(i-1)^{th}$ reflector and an $i^{th}$ reflector in the N reflectors; or
if i is an integer greater than N/2 and less than or equal to N, a spacing between an $(i-2)^{th}$ reflector and an $(i-1)^{th}$ reflector in the N reflectors is less than a spacing between the $(i-1)^{th}$ reflector and an $i^{th}$ reflector in the N reflectors.

16. The laser measurement system according to claim 11, wherein an included angle between a mirror surface normal direction of an $i^{th}$ reflector in the N reflectors and an emergent light beam of the $i^{th}$ reflector in the N reflectors is equal to an included angle between a mirror surface normal direction of the $(i+1)^{th}$ reflector in the N reflectors and an emergent light beam of the $(i+1)^{th}$ reflector in the N reflectors, and wherein i is a positive integer less than or equal to N.

17. The laser measurement system according to claim 11, wherein:
the MEMS micromirror is configured to receive emergent light beams respectively sent by the N reflectors, change directions of the emergent light beams respectively sent by the N reflectors, and send the emergent light beams respectively corresponding to the N reflectors, to implement two-dimensional scanning; and included angles between two adjacent emergent light beams in the N emergent light beams sent by the MEMS micromirror are equal.

18. A laser radar, comprising a laser measurement system and a data processing circuit, wherein:
the laser measurement system comprises N laser ranging components, a reflector, and a micro-electro-mechanical system (MEMS) micromirror, wherein:
N is a positive integer greater than or equal to 2;
each of the N laser ranging components is configured to emit an emergent light beam onto the reflector;
the reflector is configured to perform optical path reflecting on the emergent light beam, and emit the reflected emergent light beam onto the MEMS micromirror;
the MEMS micromirror is configured to (1) change a direction of the emergent light beam to implement two-dimensional scanning, (2) change a direction of an echo light beam, and (3) emit the echo light beam onto the reflector, wherein the echo light beam is a light beam reflected by the emergent light beam emitted onto a target object;
the reflector is further configured to perform optical path reflecting on the echo light beam, and emit the reflected echo light beam onto each of the N laser ranging components; and
each of the N laser ranging components is further configured to receive the echo light beam, and perform ranging based on a time difference between the emergent light beam and the echo light beam;
both the N laser ranging components and the MEMS micromirror are connected to the data processing circuit, wherein an included angle $\theta$ between emergent light beams of two adjacent laser ranging components in the N laser ranging components on a horizontal plane has a following relationship with a horizontal swing angle $\chi$ of the MEMS micromirror:

$\theta \leq 2\chi$; and the data processing circuit is configured to separately obtain data from the N laser ranging components and the MEMS micromirror, and process the data.

19. The laser radar according to claim 18, further comprising a baseplate, a support, and a connecting rod, and wherein:
the N laser ranging components and the reflector are located on the baseplate;
the support is located on the baseplate, and the MEMS micromirror is located on the support; and
two ends of the connecting rod are respectively connected to the baseplate and the data processing circuit, and the connecting rod is configured to support the data processing circuit.

* * * * *